United States Patent
Bates et al.

(10) Patent No.: US 8,762,642 B2
(45) Date of Patent: Jun. 24, 2014

(54) SYSTEM AND METHOD FOR SECURE AND RELIABLE MULTI-CLOUD DATA REPLICATION

(75) Inventors: John W. Bates, Mendon, MA (US); Mark Aldred, Franklin, MA (US)

(73) Assignee: Twinstrata Inc, Natick, MA (US)

( * ) Notice: Subject to any disclaimer, the term of this patent is extended or adjusted under 35 U.S.C. 154(b) by 427 days.

(21) Appl. No.: 12/695,250

(22) Filed: Jan. 28, 2010

(65) Prior Publication Data
US 2010/0199042 A1 Aug. 5, 2010

Related U.S. Application Data

(60) Provisional application No. 61/148,437, filed on Jan. 30, 2009.

(51) Int. Cl.
*G06F 12/00* (2006.01)
(52) U.S. Cl.
USPC .......................................... 711/118; 711/117
(58) Field of Classification Search
None
See application file for complete search history.

(56) References Cited

U.S. PATENT DOCUMENTS

| | | | |
|---|---|---|---|
| 7,457,415 B2 | 11/2008 | Reitmeier et al. | |
| 2002/0129106 A1 | 9/2002 | Gutfreund | |
| 2004/0143744 A1 | 7/2004 | Margolus et al. | |
| 2005/0108240 A1 | 5/2005 | Bolosky et al. | |
| 2006/0230076 A1 | 10/2006 | Gounares et al. | |
| 2006/0230245 A1 | 10/2006 | Gounares et al. | |
| 2006/0262933 A1 | 11/2006 | Furukawa | |
| 2007/0078982 A1 | 4/2007 | Aidun et al. | |
| 2007/0100913 A1 | 5/2007 | Sumner et al. | |
| 2007/0106712 A1 | 5/2007 | Yamato et al. | |
| 2007/0208780 A1 | 9/2007 | Anglin et al. | |
| 2007/0239952 A1 | 10/2007 | Hwang et al. | |
| 2008/0010411 A1* | 1/2008 | Yang et al. | 711/122 |
| 2008/0077638 A1 | 3/2008 | Monk et al. | |
| 2008/0080718 A1 | 4/2008 | Meijer et al. | |
| 2008/0083036 A1 | 4/2008 | Ozzie et al. | |
| 2008/0154986 A1 | 6/2008 | Kavuri et al. | |
| 2008/0162681 A1 | 7/2008 | Yellapragada et al. | |
| 2008/0243846 A1 | 10/2008 | Rasmussen | |
| 2008/0243847 A1 | 10/2008 | Rasmussen | |
| 2008/0263111 A1 | 10/2008 | Asano et al. | |
| 2008/0317068 A1 | 12/2008 | Sagar et al. | |
| 2010/0191783 A1* | 7/2010 | Mason et al. | 707/822 |
| 2010/0306500 A1* | 12/2010 | Mimatsu | 711/209 |

* cited by examiner

*Primary Examiner* — Alford W. Kindred
*Assistant Examiner* — Daniel Tsui
(74) *Attorney, Agent, or Firm* — AKC Patents LLC; Aliki K. Collins

(57) ABSTRACT

A multi-cloud data replication method includes providing a data replication cluster comprising at least a first host node and at least a first online storage cloud. The first host node is connected to the first online storage cloud via a network and comprises a server, a cloud array application and a local cache. The local cache comprises a buffer and a first storage volume comprising data cached in one or more buffer blocks of the local cache's buffer. Next, requesting authorization to perform cache flush of the cached first storage volume data to the first online storage cloud. Upon receiving approval of the authorization, encrypting the cached first storage volume data in each of the one or more buffer blocks with a data private key. Next, assigning metadata comprising at lest a unique identifier to each of the one or more buffer blocks and then encrypting the metadata with a metadata private key. Next, transmitting the one or more buffer blocks with the encrypted first storage volume data to the first online cloud storage. Next, creating a sequence of updates of the metadata, encrypting the sequence with the metadata private key and then transmitting the sequence of metadata updates to the first online storage cloud.

20 Claims, 19 Drawing Sheets

SYSTEM AND METHOD FOR SECURE AND RELIABLE MULTI-CLOUD DATA REPLICATION

CROSS REFERENCE TO RELATED CO-PENDING APPLICATIONS

This application claims the benefit of U.S. provisional application Ser. No. 61/148,437 filed on Jan. 30, 2009 and entitled SYSTEM AND METHOD FOR SECURE AND RELIABLE MULTI-CLOUD DATA REPLICATION which is commonly assigned and the contents of which are expressly incorporated herein by reference.

FIELD OF THE INVENTION

The present invention relates to a system and a method for secure and reliable multi-cloud data replication, and more particularly to secure and reliable data replication in a cloud storage array including clouds with different APIs and different requirements.

BACKGROUND OF THE INVENTION

Cloud storage refers to providing online data storage services including database-like services, web-based storage services, network attached storage services, and synchronization services. Examples of database storage services include Amazon SimpleDB, Google App Engine and BigTable datastore, among others. Examples of web-based storage services include Amazon Simple Storage Service (Amazon S3) and Nirvanix SDN, among others. Examples of network attached storage services include MobileMe, iDisk and Nirvanix NAS, among others. Examples of synchronization services include Live Mesh, MobileMe push functions and Live Desktop component, among others.

Customers usually rent data capacity on demand over the Internet, or use local pools of inexpensive storage as a private utility, anywhere within their business. Cloud storage services are usually billed on a utility computing basis, e.g., per gigabyte per month. Cloud storage provides flexibility of storage capacity planning and reduces the storage management overhead by centralizing and outsourcing data storage administrative and infrastructure costs.

However, the benefits of cloud storage do come with some significant drawbacks. Business data are extremely critical to the operations of any business and need to be reliable, secure and available on demand. Even a minor security breach or black out in the data availability can have drastic consequences. Current Internet-based cloud storage implementations do not usually deploy security measures that are adequate to protect against even minor security breaches. Availability and reliability has also not been up to the standards of even small-to-medium size enterprises. Furthermore, cloud storage is not standards-based and businesses usually need to invest in application development in order to be able to use them. In particular, different cloud storage systems provide different interfaces and have different requirements for the data presentation and transfer. For example, Amazon S3 allows reading objects containing from 1 to 5 gigabytes of data each (extents), storing each object in a file and uploading (sending data from a local system to a remote system) only the entire file, whereas Nirvanix SDN allows writing to any extent but only downloading (receiving data to a local system from a remote system) the entire file. Continuous data replication between data stored in these two different cloud storage systems is currently unavailable.

A one time data migration process from Amazon S3 to Nirvanix SDN is described in http://www.nirvanix.com/s3migrationtool.aspx. It requires downloading and installing a specialized software, is cumbersome, inefficient for continuous data replication, not reliable or secure and therefore it is currently not used at least for business storage applications.

Accordingly, there is a need for a reliable and secure multi cloud data replication solution that is secure, inexpensive, easy to use and scalable without compromising performance.

SUMMARY OF THE INVENTION

In general, in one aspect, the invention features a method for replicating data from at least a first host node to one or more online storage clouds comprising the following steps. First providing a data replication cluster comprising at least a first host node and at least a first online storage cloud. The first host node is connected to the first online storage cloud via a network and comprises a server, a cloud array application and a local cache. The local cache comprises a buffer and a first storage volume comprising data cached in one or more buffer blocks of the local cache's buffer. Next, requesting authorization to perform cache flush of the cached first storage volume data to the first online storage cloud. Upon receiving approval of the authorization, encrypting the cached first storage volume data in each of the one or more buffer blocks with a data private key. Next, assigning metadata comprising at lest a unique identifier to each of the one or more buffer blocks and then encrypting the metadata with a metadata private key. Next, transmitting the one or more buffer blocks with the encrypted first storage volume data to the first online cloud storage. Next, creating a sequence of updates of the metadata, encrypting the sequence with the metadata private key and then transmitting the sequence of metadata updates to the first online storage cloud.

Implementations of this aspect of the invention may include one or more of the following features. The metadata may further comprise one of a volume index, a region index, page index, maximum number of pages in a region, number of valid pages in a region, size of a page, file name of a page or a logical time stamp. The method may further include compressing the cached first storage volume data in each of the one or more buffer blocks. The method may further include upon receiving approval of the authorization creating a copy of each of the one or more buffer blocks comprising the cached first storage volume data. The one or more buffer blocks with the encrypted first storage volume data are transmitted to the first online cloud storage according to a RAID-1 replication algorithm. The sequence of metadata is transmitted to the first online cloud storage according to a RAID-1 replication algorithm. The method may further include the following steps. Entering a first request by a user to "write" data in the first storage volume, and receiving the first request by the server. Next, identifying the first storage volume's internal structure and initiating processing of the first request. Next, verifying first authorization of the user to "write" data in the first storage volume, and upon approval of the first authorization, passing the first request to the local cache. Next, verifying second authorization of the user to "write" data in a specific region of the first storage volume by the local cache. Upon approval of the second authorization, determining if a specific extent exists in the local cache's buffer for receiving the "write" data. Upon confirmation that the specific extent exists in the local cache's buffer, storing the "write" data in the extent. The method may further include analyzing the one or more buffer blocks to determine if data were previously written in the buffer blocks and upon determination that data were previously written in the buffer blocks, backfilling the previously written data by reading the previously written data from the online storage cloud. Upon confirmation that the specific extent does not exist in the local cache, a new extent for receiving the "write" data is allocated. Upon confirmation that the specific extent does not exist in the local cache, an existing extent for receiving the "write" data is made available. The identifying and verifying steps are performed by the cloud array application. The host node may further include a local storage device and the method may further include flushing the one or more buffer blocks with the cached first storage volume data to the local storage device. The method may further include acknowledging processing of the first request and acknowledging completion of data replication to the first online storage cloud. The first online storage cloud may include a cloud storage device and the method may further include storing the first storage volume data in the cloud storage device. The first request to "write" data is entered via a block based interface.

In general, in another aspect, the invention features a system for replicating data from at least a first host node to one or more online storage clouds. The system includes a data replication cluster comprising at least a first host node and at least a first online storage cloud. The host node is connected to the first online storage cloud via a network and comprises a server, a cloud array application and a local cache. The local cache comprises a buffer and a first storage volume comprising data cached in one or more buffer blocks of the local cache's buffer. The system also includes means for requesting authorization to perform cache flush of the cached first storage volume data to the first online storage cloud, means for encrypting the cached first storage volume data in each of the one or more buffer blocks with a data private key, means for assigning metadata comprising at least a unique identifier to each of the one or more buffer blocks, means for encrypting the metadata with a metadata private key, means for transmitting the one or more buffer blocks with the encrypted first storage volume data to the first online cloud storage, means for creating a sequence of updates of the metadata, means for encrypting the sequence with the metadata private key and means for transmitting the sequence of metadata updates to the first online storage cloud.

Implementations of this aspect of the invention may include one or more of the following features. The metadata may further comprise one of a volume index, a region index, page index, maximum number of pages in a region, number of valid pages in a region, size of a page, file name of a page or a logical time stamp. The system may further include means for compressing the cached first storage volume data in each of the one or more buffer blocks. The system may further include means for entering a first request by a user to "write" data in the first storage volume, means for receiving the first request by the server, means for identifying the first storage volume's internal structure, means for initiating processing of the first request, means for verifying first authorization of the user to "write" data in the first storage volume, and upon approval of the first authorization, passing the first request to the local cache, means for verifying second authorization of the user to "write" data in a specific region of the first storage volume by the local cache, means for determining if a specific extent exists in the local cache's buffer for receiving the "write" data and means for storing the "write" data in the extent. The means for entering a first request by a user to "write" data in the first storage volume may be a block based interface. The system may further include means for analyzing the one or more buffer blocks to determine if data were previously written in the buffer blocks and means for backfilling the previously written data by reading the previously written data from the online storage cloud. The host node may further include a local storage device and the system may further include means for flushing the one or more buffer blocks with the cached first storage volume data to the local storage device.

Among the advantages of this invention may be one or more of the following. The invention provides enterprise-level functionality, security, and reliability to cloud storage. It unifies the cloud storage interfaces of different cloud storage systems behind the standard iSCSI interface, opening the door to use by any application. Additionally, it unifies and prioritizes the management interfaces of different cloud storage systems, so that private and internet-based cloud storage systems can be used together seamlessly and efficiently. Data security is provided by encrypting all data before they leave a business' site and by encrypting all of the structure of the data. Therefore, any breaches over the network or at the vendor sites leaves intruders with an extremely substantial amount of effort to even understand what kind of data they have acquired, let alone look at the contents. Availability is increased exponentially by the use of enterprise-level replication across different Internet cloud providers or local clouds. Other features of the present cloud storage solution include significant cost savings over and above the general efficiencies of cloud storage. Bandwidth utilization is reduced, and performance is increased to the level of local storage. Additionally, data compression reduces the actual amount of cloud storage capacity used, further decreasing the cost of storage to the customer.

The details of one or more embodiments of the invention are set forth in the accompanying drawings and description below. Other features, objects and advantages of the invention will be apparent from the following description of the preferred embodiments, the drawings and from the claims.

BRIEF DESCRIPTION OF THE DRAWINGS

Referring to the figures, wherein like numerals represent like parts throughout the several views.

DETAILED DESCRIPTION OF THE INVENTION

In computing systems data are usually written in computer files and stored in some kind of durable storage medium such as hard disks, compact discs (CD), zip drives, USB flash drives or magnetic media, among others. The stored data may be numbers, text characters, or image pixels. Most computers organize files in folders, directories and catalogs. The way a computer organizes, names, stores and manipulates files is globally referred to as its file system. An extent is a contiguous area of storage in a computer file system reserved for a file. File systems include in addition to the data stored in the files other bookkeeping information (or metadata) that is typically associated with each file within the file system. This bookkeeping information (metadata) includes the length of the data contained in a file, the time the file was last modified, file creation time, the time last accessed, file's device type, owner user ID and access permission settings, among others.

Computer files are protected against accidental or deliberate damage by restricting access and implementing permissions as to who may or may not read, write, modify, delete or create files and folders. When computer files contain information that is extremely important, a back-up process is used to protect against disasters that might destroy the files. Backing up files simply means making copies of the files in a separate location so that they can be restored if something happens to the computer, or if they are deleted accidentally. There are many ways to back up files. Most computer systems provide utility programs to assist in the back-up process, which can become very time-consuming if there are many files to safeguard. Files are often copied to removable media such as writable CDs or cartridge tapes. Copying files to another hard disk in the same computer protects against failure of one disk, but if it is necessary to protect against failure or destruction of the entire computer, then copies of the files must be made on other media that can be taken away from the computer and stored in a safe, distant location.

Recently, Internet based web storage services became available that allow data storage to online cloud storage systems. These cloud storage systems present different interfaces to the local storage system and do not provide secure, easy and flexible multi-cloud data replication. The present invention provides a solution to this cloud storage problem.

Figure 1:
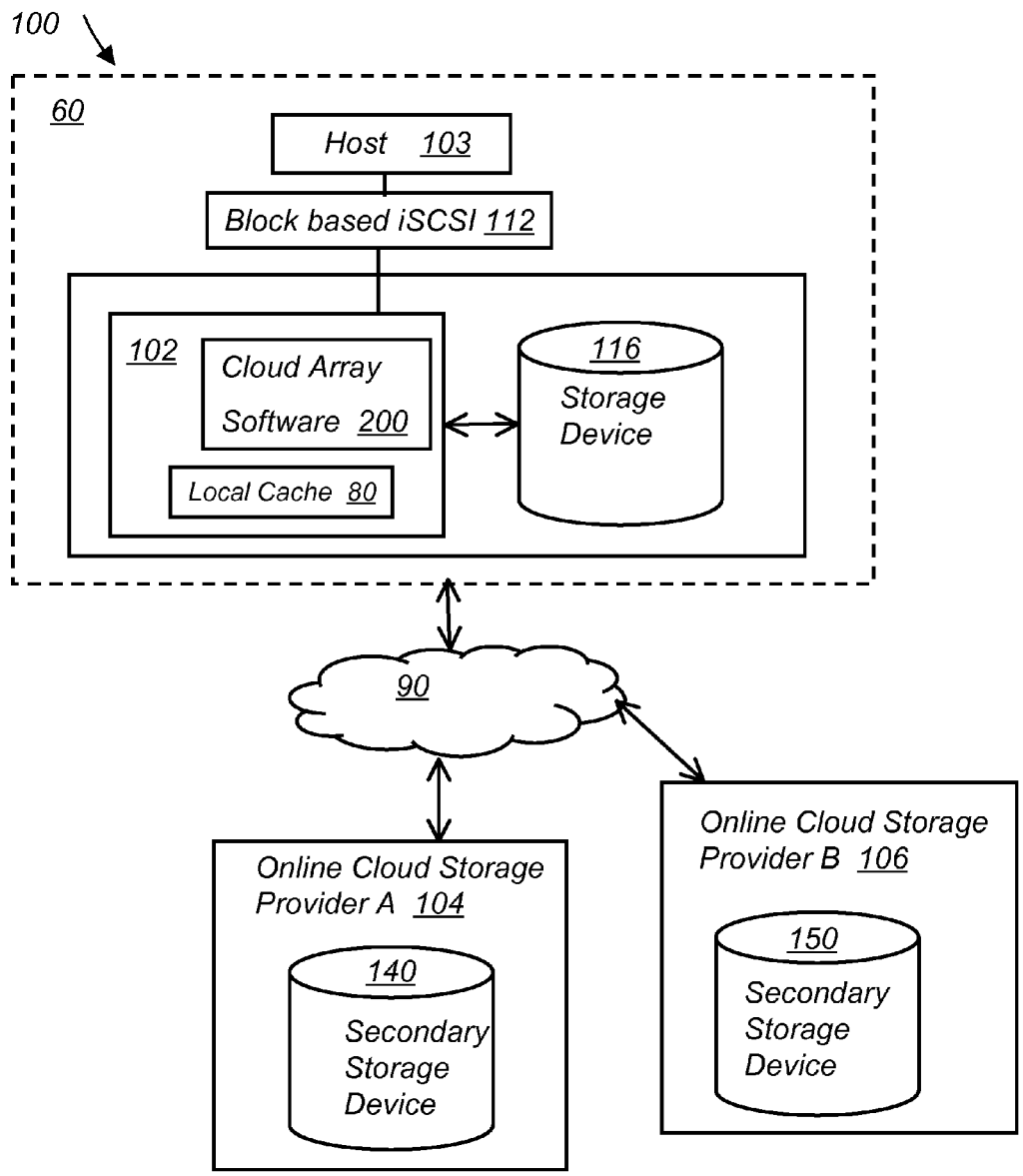
FIG. 1 is a schematic overview diagram of a single node to two-cloud data replication system.

Referring to FIG. 1, a multi-cloud replication system 100 includes a local computing system 60 connecting to one or more online cloud storage systems 104, 106 via Internet connection 90. The local computing system 60 includes a computing host 103, accessing a local storage device 116 via a node 102, a cloud array software (CAS) application 200 and a local cache 80. Host 103 issues read or write commands to local cache 80 and local storage device 116 via a standard block based iSCSI (Internet Small Computer System Interface) interface of the CAS 200. An iSCSI interface is a set of standards for physically connecting and transferring data between computer hard disks and peripheral storage devices. The iSCSI standards define commands, protocols and electrical and optical interfaces. The iSCSI protocols allow client computing devices to send iSCSI commands to iSCSI storage devices on remote servers via wide area IP (Internet Protocol) network connections, thereby creating a storage area network (SAN). Currently, iSCSI protocols are used by systems administrators to allow server computers to access disk volumes on storage arrays for storage consolidation to a central location and disaster recovery applications. The iSCSI protocols allow block level data input/output (I/O). A block is a sequence of bytes having a nominal length. In a SAN the storage devices appear to be local storage devices.

Figure 2:
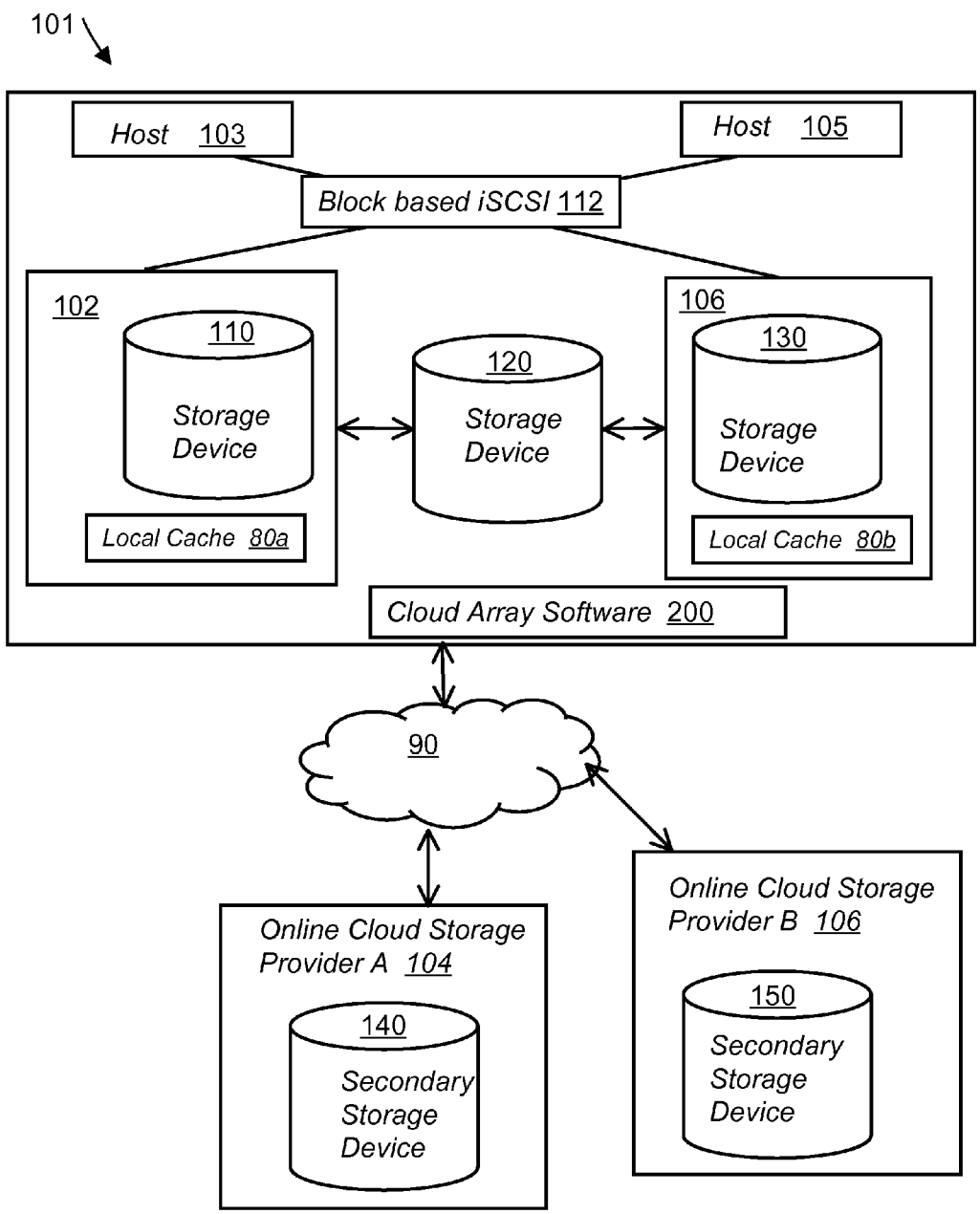
FIG. 2 is a schematic overview diagram of a two node to two-cloud data replication system.

The cloud replication system 100 may include more than one cluster nodes. Referring to FIG. 2, cloud replication system 101 includes host 103 accessing local cache 80a and local storage device 110 via the iSCSI interface 112 and host 105 accessing local cache 80b and local storage device 130 also via the iSCSI interface 112. Hosts 103 and 105 also access a shared storage device 120 via the iSCSI interface 112. In both systems 100 and 101 cloud array software application (CAS) 200 provides a secure and reliable replication of data between cloud storage 104 and 106 and the local storage devices 110, 120, 130.

In operation, an input/output (I/O) that is received from attached hosts 103, 105 via the iSCSI interface 112 is processed in several stages, passing from the host's random access memory (RAM) to the local disk storage 110, 120, 130 and to cloud storage devices 140, 150. At each step, every effort is made to complete the host's request as quickly as possible, while still maintaining correctness and reliability.

Figure 3A:
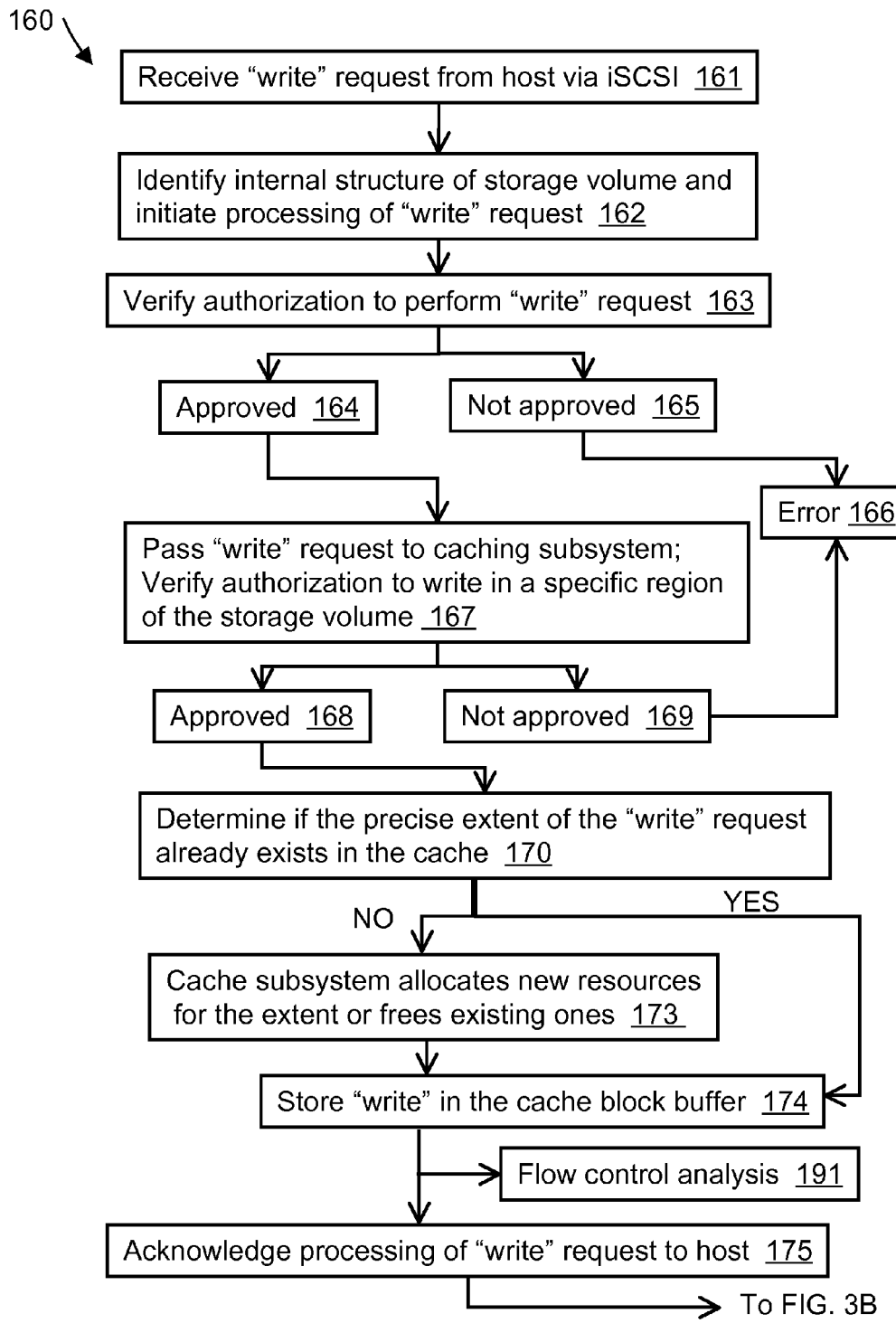
FIG. 3A-FIG. 3C is an overview block diagram of the multi cloud data replication method according to this invention.
Figure 3B:
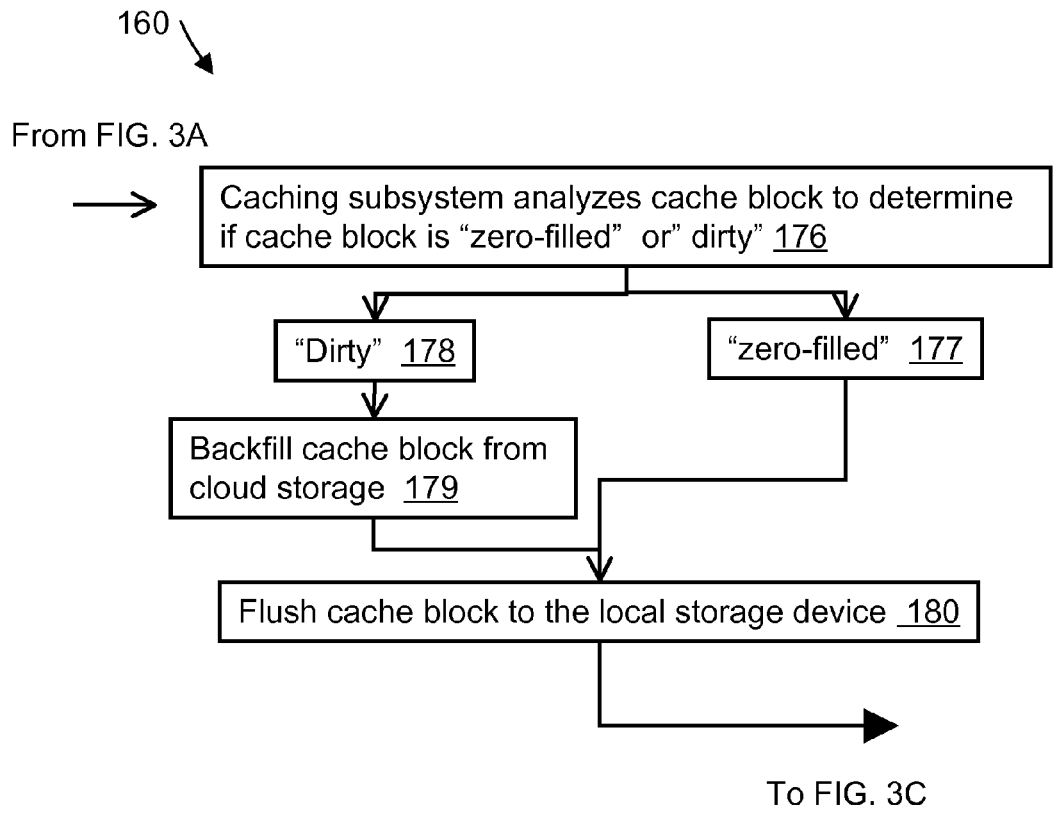
Figure 3C:
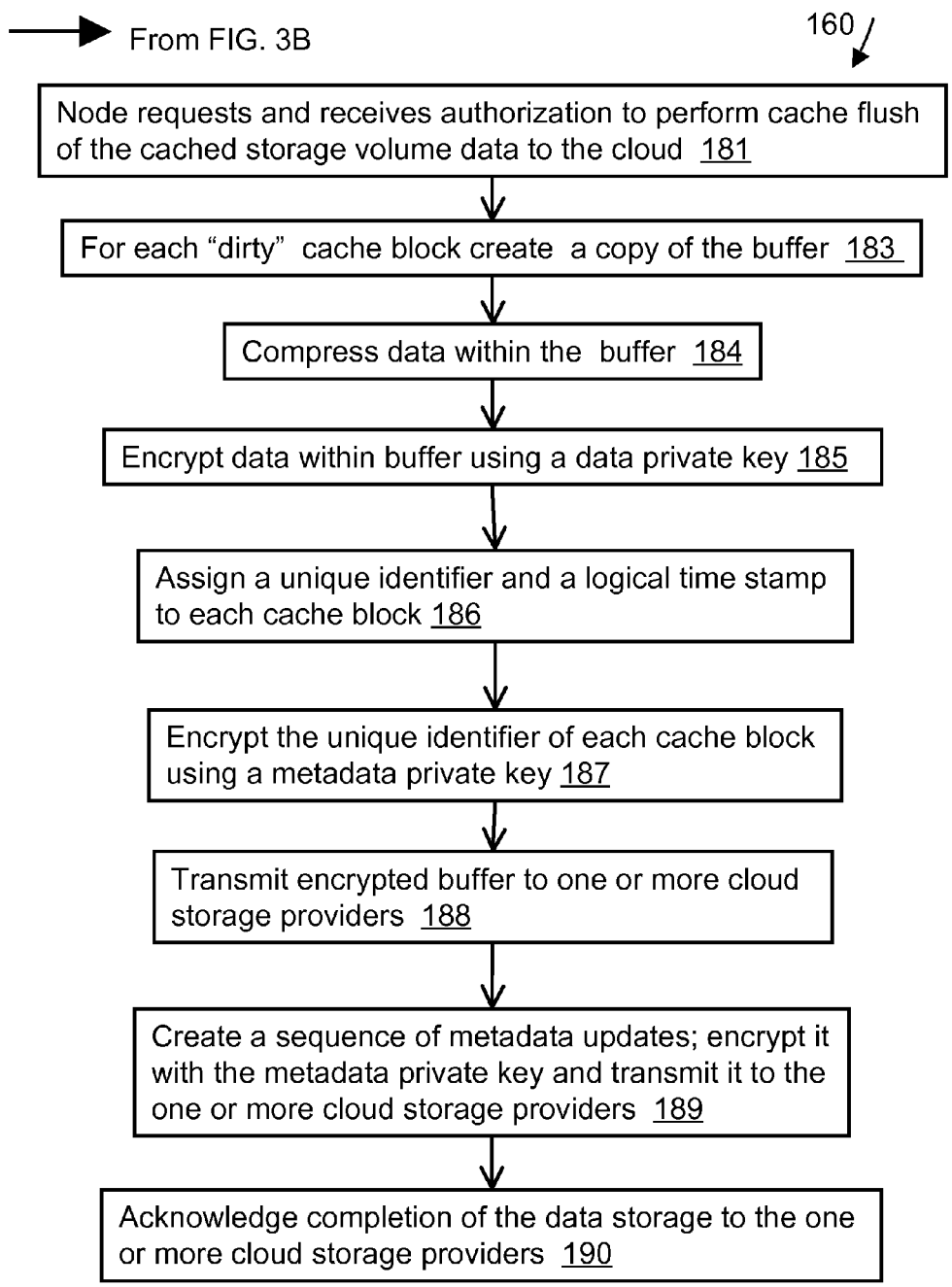

Referring to FIG. 3A, FIG. 3B and FIG. 3C, the processing 160 of an I/O request includes the following steps. In this example, the I/O is an iSCSI "write" request. In the first step, a "write" request directed to a storage volume is received from a host 103 via the iSCSI 112 (161). The Cloud Array Software (CAS) application 200 identifies the internal structure representing that storage volume by mapping the host and the storage volume identifier, and initiates processing of the host "write" request (162). Next, CAS (200) verifies that the node 102 is authorized to perform this "write" request to the identified storage volume (163). If the authorization fails (165) an error is indicated (166). Authorization may fail for a number of reasons: the node may not currently be a member of the storage cluster or the cluster may be currently partitioned, some resource necessary to the processing may be currently offline or blocked by some other node, or some other circumstance may have led to revocation of this node's authorization. If the authorization is approved (164), the "write" is passed to the caching subsystem 300, shown in FIG. 4. Next, the caching subsystem 300 checks the node's authorization to write in the specific region of the storage volume to which the "write" is to be directed (167). In the single-node system 100 of FIG. 1, the specific region authorization is unlikely to fail. However, in a system with multiple nodes, such as in FIG. 2, the storage volume is partitioned into sections, with each node having direct responsibility for some subset of those sections. For different caching configuration options, such as shared versus mirrored cache, the meaning of this responsibility may differ, as will be described below. Assuming that node 103 is authorized to write to the specific region of the storage volume (168), the caching subsystem 300 proceeds to determine if the precise extent of the "write" request is already contained within the cache 80 (170). It performs a lookup on existing cache blocks to determine if the extent is within them, matching cache blocks either contained in memory or stored in the local storage pool. If the extent does not match any existing cache blocks (171), the caching subsystem 300 attempts to allocate cache resources for the extent, either by allocating new resources or by freeing existing ones, if no more capacity is available (173). Cache blocks are allocated in very large segments, ranging from 64 kilobytes to a full megabyte, depending upon configuration choices. Once the new cache block is allocated, the write is stored in the appropriate locations in the cache block buffer 82, shown in FIG. 6 (174). In a mirrored cache configuration, some form of consensus via a distributed algorithm such as a replicated state machine must be achieved before the write is stored in the buffer. If the extent matches an existing cache block (172), the "write" request is stored in the appropriate locations in the cache block buffer (174).

Whether the write is also immediately stored on disk in the local storage 116 is configuration dependent. A "dirty mask" structure 86 indicating the location of the valid data in the cache buffer 84 is simultaneously updated, shown in FIG. 6. Upon completion of the cache buffer updates, initial processing of the "write" request is almost completed. At this point, a flow control analysis (191) is performed to determine the amount of host I/O processing being performed, and if the rest of the system is in danger of lagging too far behind the host processing, a small amount of additional latency may be introduced. Subsequently flow control is done, if necessary, simply by pausing the response to the host for a very short period of time and identifying and amortizing the overhead of remote transmissions over as many of the incoming requests as possible to avoid any single slowdown potentially causing failure or noticeable problems. Flow control reduces and eliminates the possibility of catastrophic I/O errors on the host due to unacceptably long periods of slowdown within CAS (200).

At this point, the first stage of the CAS (200) processing of the "write" request has been completed and is returned successfully to the host (175). In the next stage, (shown in FIG. 3B) after acknowledging to the host 103, the caching subsystem 300 is reactivated to analyze the cache block (176). If the cache block represents a block on the storage volume that has never been written to before (or which has been deleted), then the cache buffer is "zero-filled" (177). If the storage volume block has been previously written, i.e., is "dirty" the cache block must be backfilled by reading its data from an underlying cloud storage device and then the entire cache block is flushed to the local storage device (180). Assuming the cache buffer is zero-filled (177), excepting for the extent matching the dirty mask and containing the data from the previous disk, the entire cache block is then flushed to the local storage device (180).

At some point during the process, a cache flush from the node to one or more clouds 104, 105 is scheduled. The node requests and receives authorization to begin a flush of the cached storage volume data to the cloud. Each "dirty" cache block (cache blocks containing non-zero dirty masks) passes through the following series of processing steps. First, copy of the buffer is created (183), and then the data within the buffer are compressed (184) and encrypted using a data private key (symmetric) (185). Next, the cache block is assigned a unique identifier, including a logical timestamp (186), and then the cache block's unique identifier is encrypted using a metadata private key (symmetric) (187). After these steps are performed, the resulting buffer is transmitted to one or more cloud storage providers 104, 106, according to a RAID-1 replication algorithm (188). After all of the "dirty" cache blocks are processed, a further sequence of metadata updates is created, the metadata are encrypted using the metadata private key, and then the encrypted metadata are transmitted to the cloud storage providers, again according to a RAID-1 algorithm (189). The last such metadata "write" serves to atomically "activate" the flush, switching the state of the storage volume stored in the cloud to reflect the state of the volume stored in local cache at the time the flush was initiated.

Figure 4:
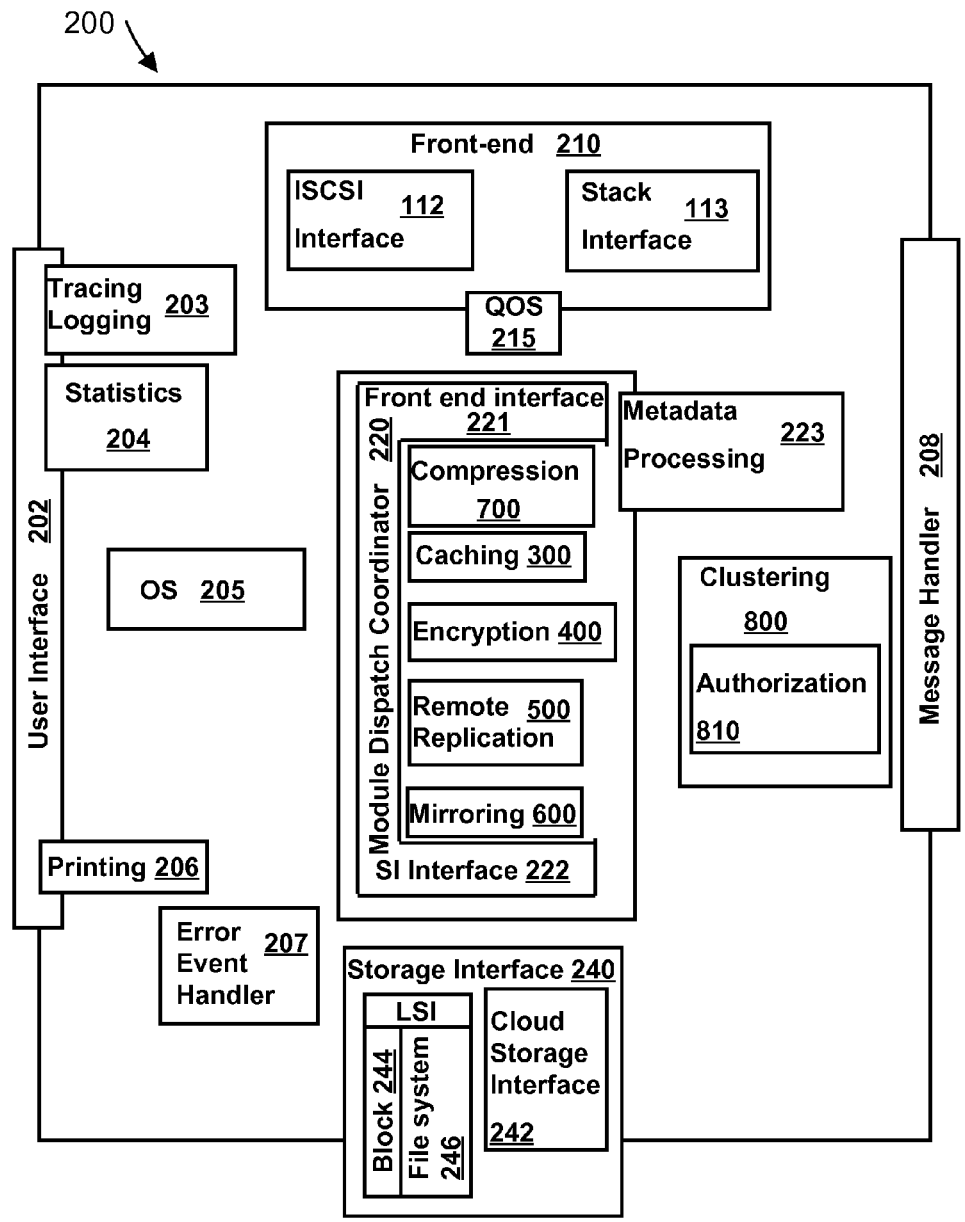
FIG. 4 is a schematic diagram of the cloud array software (CAS) of FIG. 1.

Referring to FIG. 4, the architecture of cloud area software (CAS) 200 includes four major functional areas: operating system (OS), infrastructure, modules and interfaces. OS 205 provides support for operating system primitives such as threads, memory management, events, and semaphores, among others. The infrastructure provides basic services such as statistics 204, printing 206, logging 203, clustering and authorization 800, metadata processing 223, error event handling 207, and message handling 208. The interfaces include all physical and logical external interfaces to the software 200. These include the user interface (UI) 202, I/O front end interface 210, and storage interface 240. The front end interface 210 includes the iSCSI interface 112 and a stack interface 113. The storage interface 240 includes the cloud storage interface 242 and local storage (LSI) block-type interfaces 240 and file system interfaces 246. The modules provide all the advanced features of the present cloud replication application such as caching 300, encryption 400, remote replication 500, mirroring 600, and compression 700. Each module shares a common interface so that modules may be added or removed or have their call sequence changed without software modifications. Additionally, certain features can be enabled or disabled based on the specific licenses each customer owns.

The interaction among the modules can be implemented as a stack where each module knows where to send the I/O next, or with a dispatch handler coordinating the work of the modules. In the embodiment of FIG. 4, a module dispatch coordinator (MDC) 220 is used for coordinating the interactions between modules 300, 400, 500, 600 and 700. Modules 300, 400, 500, 600 and 700 process both user data and metadata. A single front end interface 221 and a single storage interface (SI) interface 222 allow operations on user data as well as metadata.

Figure 5:
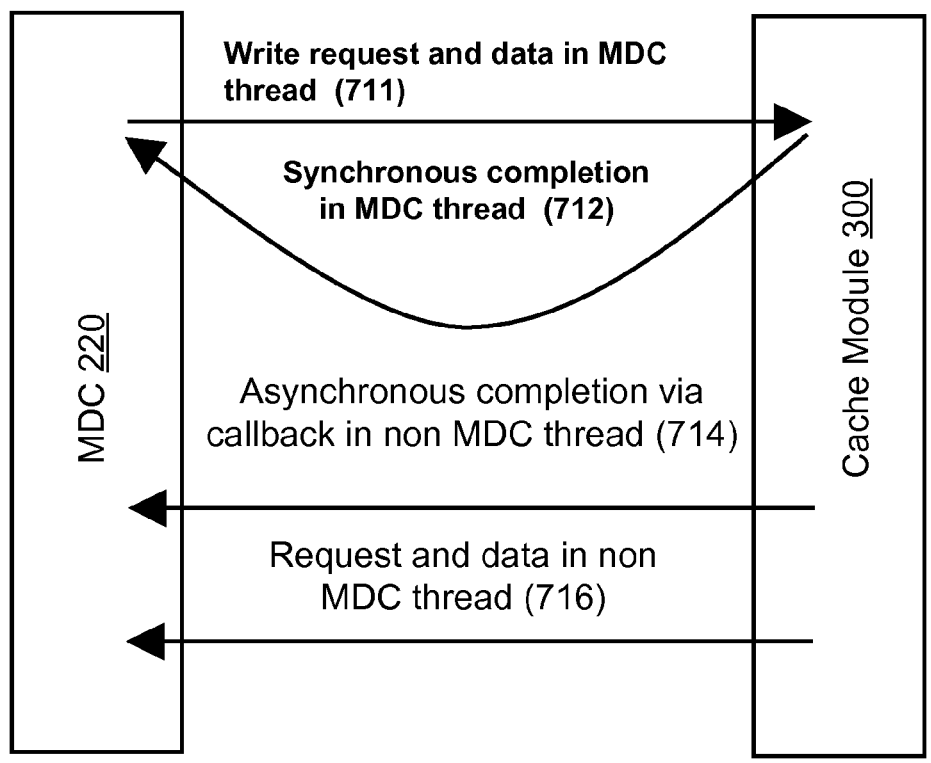
FIG. 5 is a schematic diagram of the available communication paths between the Module Dispatch Coordinator (MDC) and the process modules in the CAS of FIG. 4.

Interfaces 221, 222 describe the data location, size, volume and their location within the volume. Interfaces 221, 222 also provide a completion mechanism which is invoked when a module completes the data processing. These interfaces 221, 222 do not need to describe what has been done to the data in the previous steps. For example, there is no need for caching to know if the data has been previously encrypted, compressed, or replicated. As a read or write I/O request moves through the modules the MDC 220 gives the request to the next module assigned to process the I/O. Referring to FIG. 5, once the MDC 220 gives an I/O request (i.e., a write request) to a module (i.e., cache module (300)), the MDC 220 will forward that request no further (711). Upon completion of the request the module 300 sends back a confirmation to MDC 220 (712). When there are no more modules remaining to process the I/O request, the MDC 220 passes the request to the SI 240 or to the front-end 210 interfaces. This design forces all modules to rely on the MDC 220 for actually moving the data.

The MDC 220 is a single thread process with queues of work items. New work elements are placed in the pending queue. The modules 300, 400, 500, 600, and 700 themselves may have their own threads to perform specialized work, but most of the routine actions are performed in the context of other system threads. Referring again to FIG. 5, a write request comes in from iSCSI 112 and is passed to the MDC 220 and placed in the pending queue. The MDC 220 process runs and takes the work off the pending queue, moves it to the active queue and invokes the cache module 300 (711). All read and write requests are sent through the cache module 300 because only it knows what caching policies are needed. The cache code running in the MDC thread allocates a cache page, and issues an asynchronous write of the page to cache, and sends an asynchronous message to a remote node and/or cloud storage to mirror the data. The cache code interfaces directly with the cluster code to send the message but the write of the cache page is directed through the MDC 220. Control is then returned to the MDC code with a status indicating that cache has not completed processing this request yet. The work request remains in the active queue and the MDC looks for more work in the pending queue and may issue new requests. When the SI 240 completes the page write it invokes a callback function in cache signaling that the work is complete. Now cache is running in the SI callback thread. However, the mirror write has not been completed, so cache has nothing to do. Later the message interface invokes a different callback function informing cache that the mirror write has been completed. Now that this I/O write request is complete, cache 300 invokes a callback to MDC 220 notifying it that the cache has completed its processing of the I/O write request (714). This callback to MDC occurs in the message callback thread. Therefore, the MDC callback function changes the state of the work element indicating that it is ready for more processing and signals the MDC thread. At some point the MDC thread will run, see that this cache has completed processing this item and send the response to the front-end interface 210.

The cache module 300 has one thread, the flush thread, which is all its own. The flush thread runs periodically looking for dirty cache pages which need to be flushed to a disk. When such a page is found the cache thread initiates an I/O request to the MDC (716). The request is queued and later processed by the MDC thread. When the MDC thread runs, it must push the data down through the module hierarchy toward the SI 240. The data may be encrypted and have the opportunity for remote replication. These modules may perform the processing entirely in the MDC thread context allowing the MDC to move the I/O all the way to the SI without a context switch. On the other hand they may behave like cache and defer the I/O to a later time. The design of the interface between the modules and the MDC allows for both types of processing.

Configuration data for each volume across a cluster may be saved in the MDC or in a specific module. For example, when caching, encryption or some other feature is enabled for a specific volume across the cluster, this configuration data may be saved in each respective module (i.e., 300, 400) or the MDC 220. In other words, the decision to invoke the services of a module for a given I/O request may be made by the MDC or by the specific module. If the MDC has this information then it can simply not call the module at all for a disable feature. If it is the module which maintains the configuration information then it must be invoked for every I/O request so that the module can determine if it has work to perform. Accordingly, each module has a configuration interface which is called directly by the user interface (UI) 202. There is no need to pass the request through the MDC. This interface allows the UI 202 to modify and query the state of the volumes and other aspects of the module such as statistics. The modules save the configuration data with a write through the MDC interface to the cloud storage interface(CSI) 242.

Each cluster node generates metadata information as part of its normal activities. The metadata information includes mostly static data such as configuration, volatile data such as cluster state and user volume to cloud mappings as well as account information and logs, among others. Metadata are equally important as the user data. Without the metadata application 200 may not be able to access the user data, or may corrupt the user data. The term metadata refers to the data which must be made persistent. Metadata are stored persistently in the cloud storage and are handled by the modules just as user data are handled. Metadata may be generated by any component of the cluster node. Therefore, a mechanism is needed to insert these data into the I/O processing of the modules. The MDC provides an interface to all of the cluster nodes for accessing metadata through the SI.

Any I/O request initiated by a module to the MDC starts at the top of the MDC module stack so that it has all module services available to it. For example, if the module order for a given host I/O is compression→cache→encryption→replication and when the host I/O is nearly complete, replication generates metadata which need to be read. The read request is given to the MDC which then starts processing the read with compression, followed by cache, followed by encryption and followed by replication. This allows the metadata to be deduplicated, cached, encrypted, and replicated.

However, not all metadata I/O requests need to be presented to all modules. For example, in the case of a cache metadata write, if the MDC gives this write request to the cache module 300 then that is likely to generate another metadata operation and a yet another MDC request to the cache module thereby resulting in infinite recursion. To solve this problem all metadata I/O requests presented to the MDC require that certain modules are not used in the processing of the I/O. In this case the MDC simply bypasses the specified modules entirely for this one I/O. In general, components accessing metadata provide a global unique identifier index (GUID), a local unique identifier (LUID) index, a buffer and a length to the MDC interface.

Caching Process

In computer terminology "cache" is a temporary storage area where frequently accessed data are stored for rapid access. Once the data are stored in the cache, future use can be made by accessing the cached copy rather than re-fetching or recomputing the original data, so that the average access time is shorter. The cloud replication system 100 maintains a large local cache for storing host data and the associated metadata. The system cache is not a standard storage array cache and is not maintained exclusively in random access memory (RAM) sitting on the same board that is processing the I/O requests. The system cache is on a disk and while much slower than RAM is much faster than standard cloud storage. The caching module 300 is assumed to have no knowledge of the type of storage (raw device, file system) which is being used for the cache. An unlimited cache size is supported but there may be a maximum per volume cache size. Cache page sizes are configurable up to several megabytes. Recommendations for page sizes are provided based on the specific backing cloud vendor(s) and applications using the data. Access to the cloud storage (which is being cached) is assumed to be slow.

Figure 6:
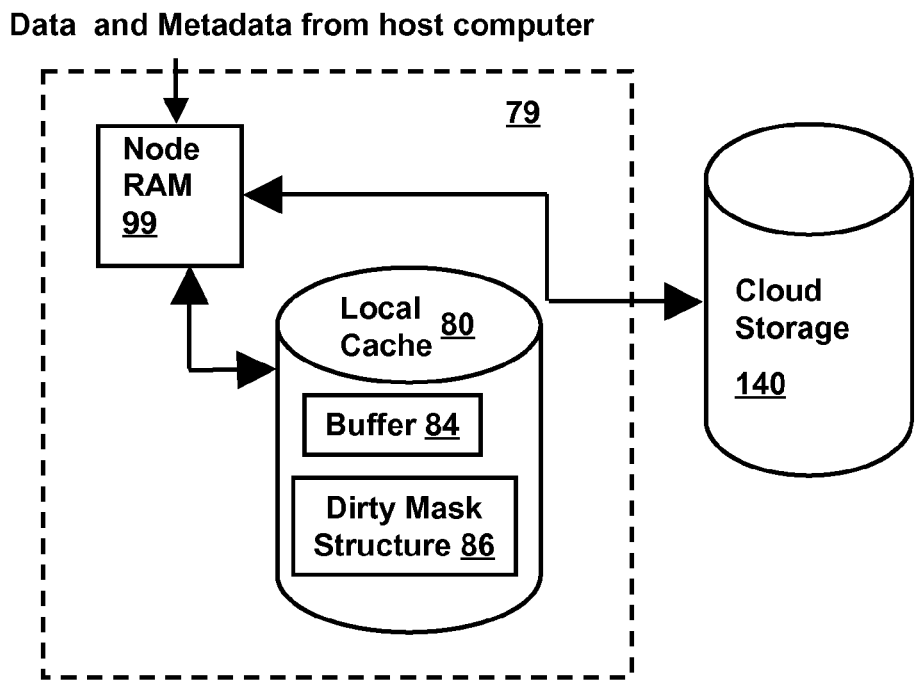
FIG. 6 depicts a block diagram of the cache organization for the system of FIG. 1.

Referring to FIG. 6, the cache 79 of the replication system 100 includes two levels of storage, node RAM 99 and the local array storage 80 (local cache). The cloud storage 140 is the persistent backing storage which is being cached. Data are sent from the host computer 103 into the cluster node 102 and placed in buffers in the node RAM 99. These buffers are then written to cache pages in the local cache 80. There is no direct path from the local cache 80 to the cloud 140, consequently, for a page to be flushed it must be read into the node RAM 99 first and then written to the cloud 140. The opposite is true for loading the cache in response to a host read. In other embodiments, the "correct" cache pages are allowed to remain in node RAM 99 which may lead to reduced disk access to the local cache 80.

The interaction of the cluster node 102 with the caching module 300 is described next. When mirrored caching is in use, as is the case in FIG. 7A, the caching module 300 tracks which node in the cluster is mirroring the data for each I/O. It may be also possible that mirroring is tracked on the volume or some other level, but whatever granularity is chosen, it is the responsibility of the caching module 300 to manage this. The cluster module 800 provides methods for other modules, such as caching 300, which permit discovering the list of nodes currently participating in the cluster. There is also a mechanism for the cluster module 800 to notify registered modules on the node of the failure or loss of communication with other nodes. Cluster mode 800 also provides the internode locking functionality. It is the responsibility of the caching module 300 to resolve a sudden loss of redundancy by finding a new node in the cluster to mirror with and/or initiating high priority flushes of the data which are no longer mirrored. Therefore, the caching module 300 is aware of the state of each module participating in the cluster.

Referring back to FIG. 2, an N-way active/active system 101, includes a network of independent processing nodes (in this case N=2 and includes nodes 102, 106) having access to the common replicated data in cloud storage 140 such that each node can participate in a common application. A write cache process is implemented based on a volume master, true active/active or region based.

In the volume master case I/O processing, there is a single cluster node which is responsible for processing all read and write requests for a given volume and for maintaining the cache for that volume. A read or write request to a volume which arrives at a node which is not the master is forwarded to the master for processing. The primary disadvantage of this mode is that unless the hosts are very careful in choosing the appropriate cluster node when issuing an I/O request there will be a substantial number of I/Os which must be forwarded to the master resulting in decreased I/O performance due to the extra step. Additionally, the master becomes a bottleneck for a heavily used volume.

In the true active/active I/O processing any node can handle any I/O request from any host for any volume. Locks are present on each I/O request to preserve cache coherency and data integrity. The advantage of this I/O processing mode is that the I/O processing for a volume can be distributed evenly across a large number of cluster nodes assuming the host access is evenly distributed. The disadvantage is that the locking overhead can severely impact I/O performance. Additionally, each time a lock is released for a cache page the corresponding cache page must be invalidated, making the cache virtually useless.

Region based active/active I/O processing allows the volume to be split into many regions. Each region is controlled by a single cluster node. Access to a region is controlled by a lock but given appropriate sized region the lock contention is much less than is seen in the true active/active implementation. It also allows for many nodes to process I/O for the volume concurrently thus distributing the load. Host I/O received at a non owning node are forwarded at the iSCSI layer to the owning node. Region ownership may move from node to node based on host I/O traffic and other performance issues. The disadvantage of this processing method is that the design is difficult. The optimal implementation depends on host I/O patterns which are constantly changing.

A cache region is a set of consecutively addressed cache pages which are protected by a single authorization. The owner of the region controls all cache pages for the region. Only the region owner and the mirroring node (if mirroring is active) can have valid pages for the region. Upon losing region ownership a node will invalidate all pages for that region. Obviously, any dirty pages must be flushed to disk before ownership is lost.

Region ownership is controlled by authorization access 810 granted by the cluster module 800. Other nodes can not take ownership away from a node except in special conditions (such as node death which is controlled by the cluster). However, if a non owning node is being forced to forward a significant amount of host I/O to the owning node, the non owning node may initiate an ownership transfer request. If the owning node agrees then it releases its authorization.

The CAS 200 supports configurable page sizes from 512 bytes to 8 MB on a per volume basis. The page size must be specified at volume creation. The page size can be changed at any time while I/O to the volume is in progress, but the user will see performance degradation while the cache page size is being adjusted.

Figure 17:
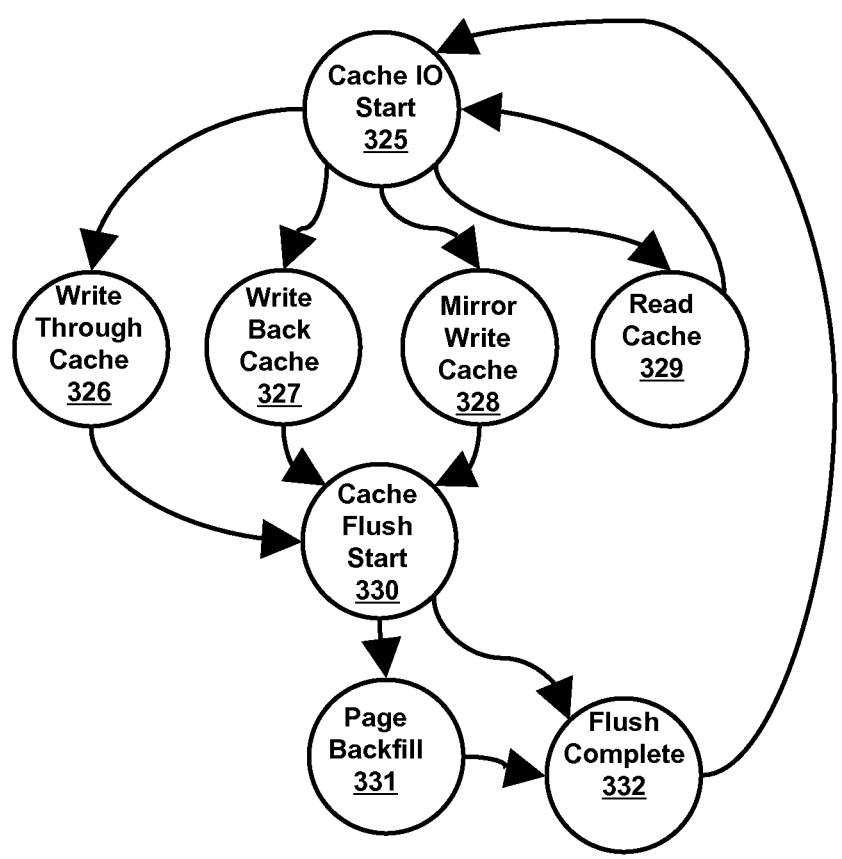
FIG. 17 is a schematic diagram depicting the caching processes.

Page filling is the process of putting host writes into a page in the cache. A cache page may be large and unlikely to be filled by a single I/O. Traditionally when a cache write is being processed which does not fill the entire page and a cache miss has occurred, the page is backfilled from the backing (cloud) storage and the new data is written into the page. Currently, access to the backing storage (cloud) is expensive and slow. Therefore, the cache page is not backfilled when a cache miss occurs for a write. Rather a new page is allocated and filled until either the page needs to be flushed to the cloud or a read is issued to the page. In either case the old cache page is read from the cloud and merged with the new cache page. For the merge to be possible the cache must remember which portions of the new page have new data. This is accomplished with a valid data map. The new data are then copied into the old page (or the other way around depending on efficiency). The cache is large enough to allow holding of a page in cache for a long time. The read and write caches share a unified space in the cache. There is no distinction between the pages. If a read results in a cache hit then the data are transferred to the host. If a cache miss occurs then the data are read into the RAM portion of the cache before the host transfer. Writing the page to the array cache is optional based on the algorithms of the cache. The CAS software uses "write anywhere" technology. This means that when a host computer asks a cluster node to write to a specific location in a file system, the cluster node can write the data anywhere in the cloud array but it must maintain a map so that it can retrieve the data later. The map is maintained by the Storage Interface 240. Referring to FIG. 17, a cache I/O 325 may be processed as a "write through" cache 326, a "write back" cache 327, a "mirror write" cache 328 or as a "read" cache 329. A write through cache 326 commits the data to the backing storage (cloud) before acknowledging completion of the write to the host computer. The data are transferred to the cloud via a cache flush operation 330. For operations that involve small writes but use large cache pages this may be extremely inefficient. Consider a 512 byte host write to a volume that has a 1 MB cache page. Because the cloud only allows files (cache pages) to be written in their entirety, the node must first read the 1 MB page from the cloud into RAM, insert the new 512 bytes of data then write the 1 MB page to the cloud. This page backfill operation 331 moves 4096 times more data than the host requested to be written. In the case of a cache hit we avoid the backfill 331 from the cloud and only need to exceed the requested data transfer size to the cloud by a factor of 2048. However, a cache hit may still require that the 1 MB page be read from the cache array into RAM. In the case of a cache miss, the cache page never actually needs to enter the cache. It goes straight from the cloud 140 to RAM 99 and back to the cloud 140 again. Because writing to the cache is more expensive that writing to RAM one could avoid the write to cache altogether unless the data need to be read back soon. The demands on RAM are likely to result in a very short lifespan of cache pages there. The result of not writing the page to the array cache is virtually the same as disabling write through caching. Therefore, not writing to the cache is not recommended. If write through caching is enabled then cache it.

A "write back" cache 327 is where a large cache page may be much more efficient. Here we accept host writes and save the data into the cache without flushing the page to the cloud. Many writes can be processed, perhaps filling the page before it is flushed 330. If any part of the cache page has not been rewritten with new data when the flush is to begin, then the entire old copy of the cache page must be read from the cloud for backfilling 331. So one can only avoid the costly backfill if the page is completely rewritten. Therefore properly configured page sizes are recommended.

Figure 7A:
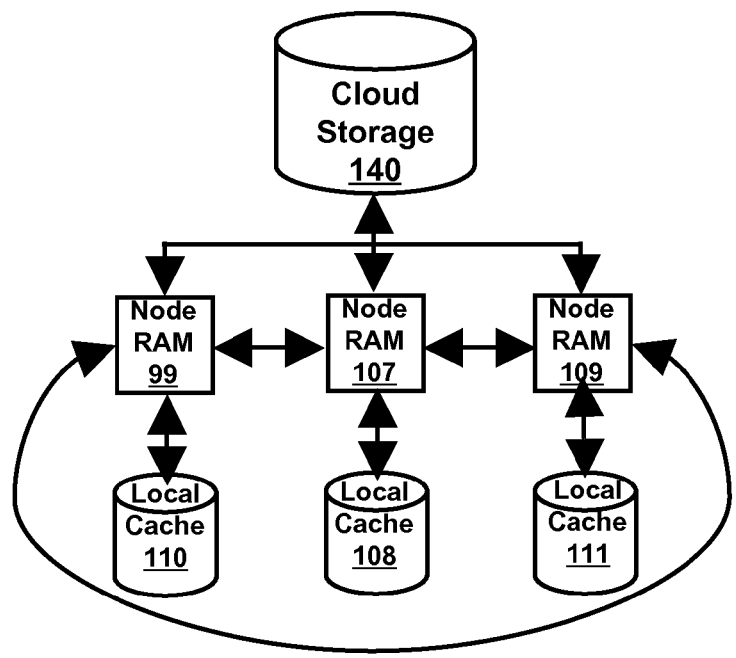
FIG. 7A depicts a block diagram of local caching and cloud storage for a multi node system.

Mirrored caching or "mirror write" cache 328 is a special case of write-back caching where the data are written to more than one cache. Mirrored caching by definition occurs only in a multi node cluster and describes writing to the caches of more than one cluster node, as shown in FIG. 7A. The nodes must be geographically near each other to minimize latency. The purpose of mirrored caching is to make the cache highly available when the storage hosting the cache is not. Mirrored write caching is not equivalent to remote replication. When the owner of a cache page receives a write request that is to be mirrored it must save the data in its own local cache. In addition the cluster software 800 will select a remote node which will mirror the data. Selecting a node on the fly, which results in an efficient distribution of mirrored data across the cluster, will likely require more message passing than is desired to complete the I/O. Having one node acting as a dedicated mirror for another will likely cause I/O bottlenecks. However, any dedicated mirroring relationship complicates configuration changes such as adding (or removing) a new node to the cluster, changing volume exposures to the hosts (which nodes expose which volumes).

Local cache is storage which can be accessed only by one node. In the example of FIG. 2 storage device 110 is the local cache of node 102 and storage device 130 is the local cache of node 106. The local cache can be a local disk or array, among others. The key is that the cache pages in the cache can only be accessed by a dedicated cluster node. If that node is not available then the cache is not available and by extension all volumes with dirty cache pages are not available. Mirrored caching may be used in a local cache configuration. An example of a local cache configuration is shown in FIG. 7A.

Figure 7B:
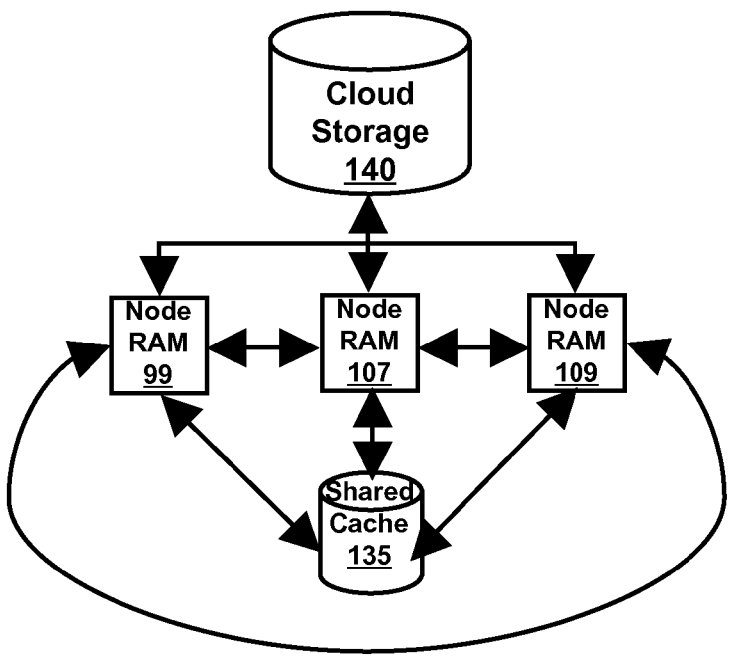
FIG. 7B depicts a block diagram of shared caching and cloud storage for a multi node system.

A shared cache is used when the storage used for the cache is a highly available enterprise array. Multiple nodes read and write the same cache pages directly. There is no need to mirror pages among nodes because each node has access to the pages written by all other nodes and the storage used for the cache is assumed to be reliable. Each node must still maintain its own cache metadata as will be shown shortly. An example of a shared cache configuration is shown in FIG. 7B.

The present cluster system does not allow shared caching and local caching to coexist. All nodes in the cluster must use the same caching scheme. Furthermore, if shared caching is in use then all nodes in the cluster must have access to the same cache storage. A user can not have split shared caches. Other embodiments allow shared caching and local caching to coexist.

Crash Consistency

Figure 8:
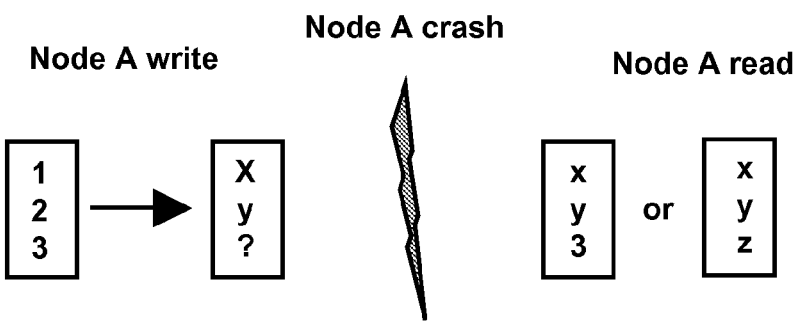
FIG. 8 is a schematic diagram of the crash consistency provided by CAS.

When a node or cluster crash occurs the data must remain consistent. Referring to FIG. 8, a volume has initial values of 1, 2 and 3. Node A receives writes x, y and z to replace 1, 2 and 3 for that volume. Writes x and y are completed and acknowledged to the host. While processing write z node A crashes. The host issues a read to node A of the location where x, y and z were written. Node A may return either x, y, 3 or x, y, z. Either is acceptable because the host write was never acknowledged and the write is still in progress. While the write is in progress a concurrent read can return z or 3. But once some of the data is returned to the host, the CAS software must guarantee that the returned data is what is flushed to the cloud and returned for all future host reads. This assumes that failure of node A while writing data z will not in itself leave the data inconsistent. This is accomplished by taking advantage of the write-anywhere architecture. A cache page in the array has associated metadata. The metadata tells the cache software where the cache page can be found. The cache page is update by writing the new page to free space on the disk,
updating the metadata to point to the new page
freeing the old page.

This guarantees that any attempt to read the cache page will either get the old page or the new one, not a combination of the two or nothing. For this to work the metadata update must be atomic. This is usually done by restricting the metadata to a single sector.

Consistency Groups

Figure 9:
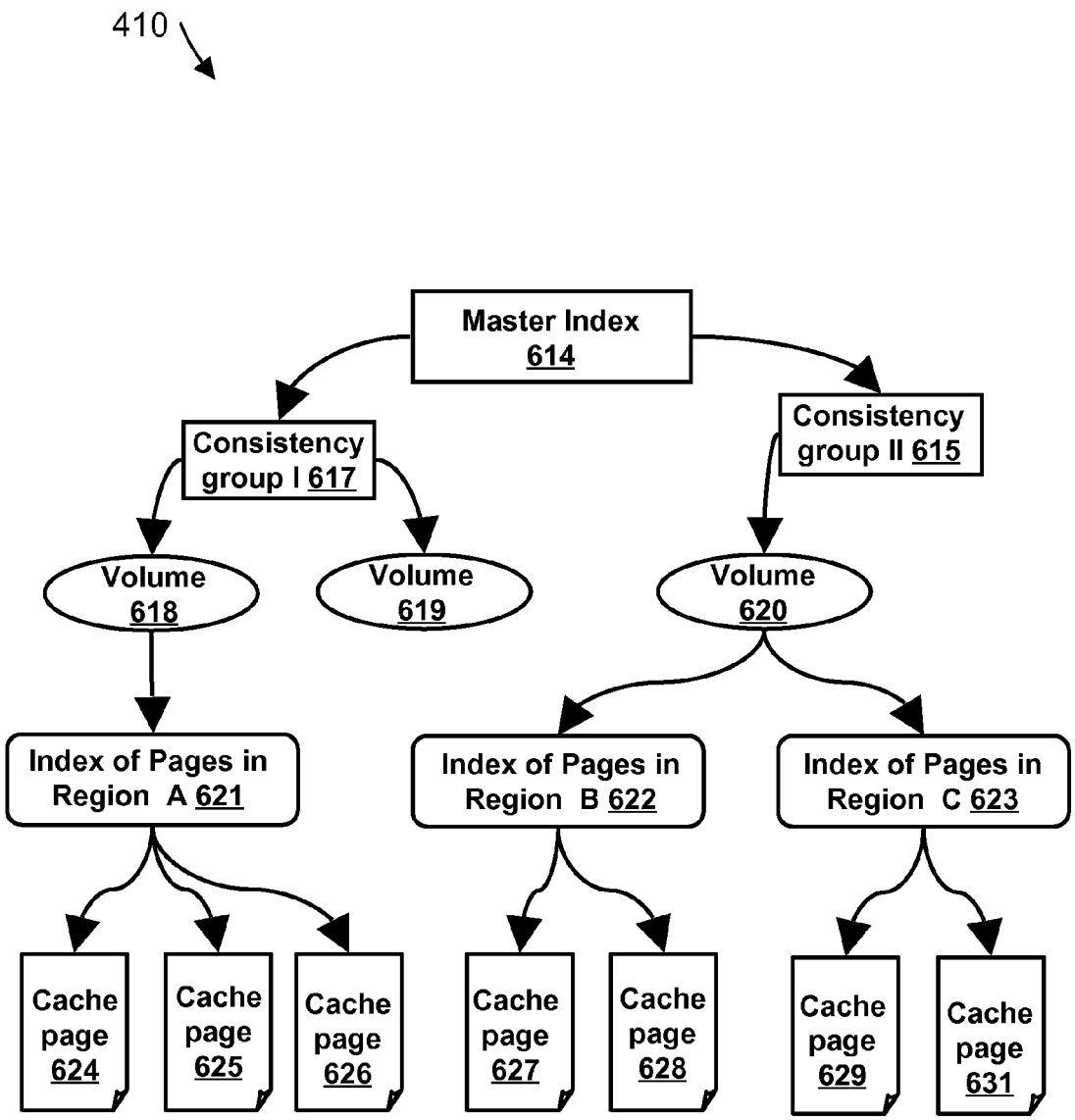
FIG. 9 is a schematic diagram of the cloud layout of cache pages and the associated metadata.
Figure 10:
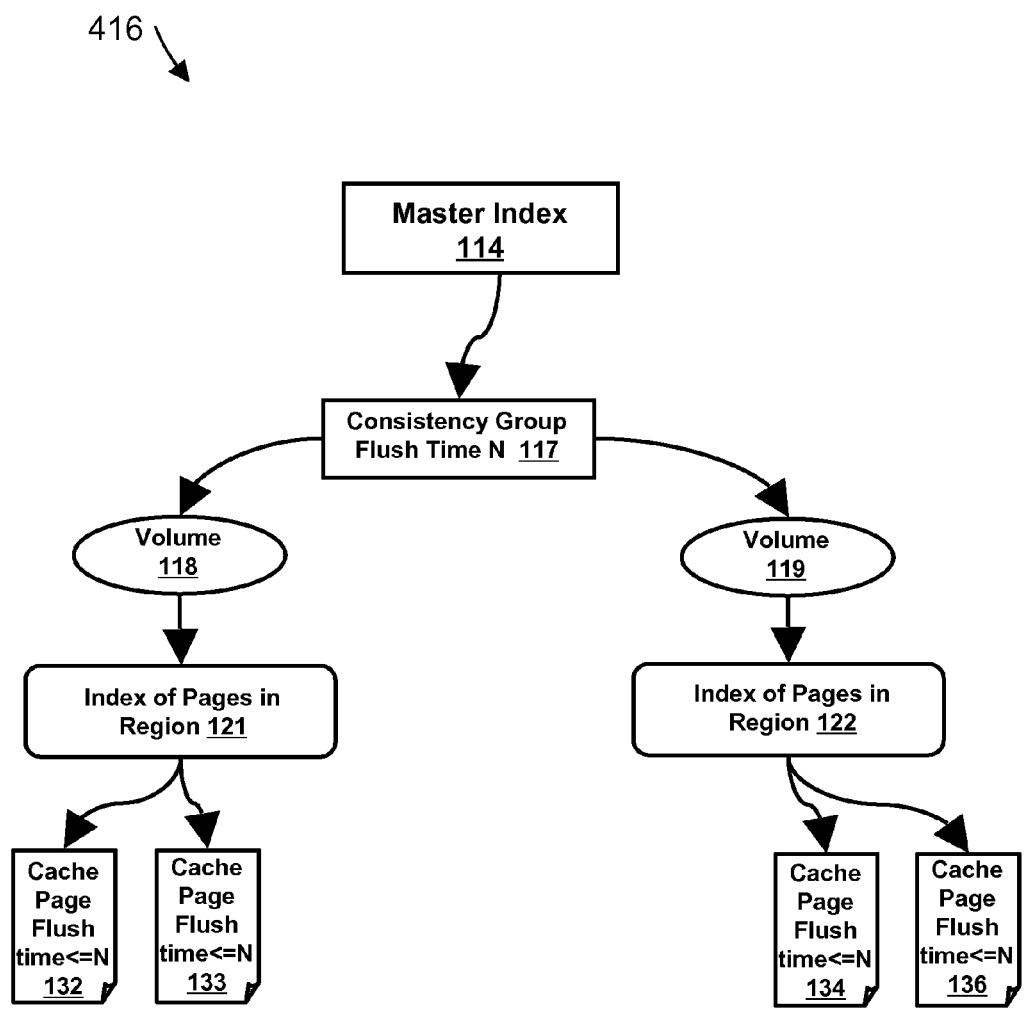
FIG. 10 is a schematic diagram of the initial state before a cache flush.

A consistency group (CG) is a set of volumes which have host defined interdependencies. FIG. 9 depicts examples of consistency groups I and II. Host software requires that all volumes in a consistency group share crash consistency operations. The example of FIG. 8 illustrates the case when the "write" requests occur to a single volume. In cases where each "write" is directed to a different volume, the scenario described in FIG. 8 is still applicable, provided each of the volumes is in the same CG.

Cached Volume Exposure

The set of cluster nodes which may expose a given volume is restricted by the caching options configured for the volume or cluster. Assuming that every volume is part of a consistency group and that the default is that there is one volume per consistency group. If the cache is local and unmirrored, then volumes in the consistency group must always access the cache through a single node. Only that node can flush the cache pages for all the volumes in the consistency group. If the cache is mirrored, then the volumes in the consistency group may be accessed through any cluster node but only one of the nodes involved in the mirror can perform the flushes for all pages in the consistency group. If the cache is shared, then a volume in the consistency group may access its cache through any cluster node in the cluster, but the cluster is responsible for maintaining metadata consistency, and flushes always occur through one node at a time (flush token). There is one flush token per consistency group.

Cache Page Flushing

Flushing the cache to the cloud storage 140 is done from the memory of the cluster node 99 (node RAM) and not directly from the storage disks 116 (local cache) housing the cache, as shown in FIG. 6. For this reason, one should attempt to flush the data to the permanent storage in the cloud before freeing the buffer in the cluster node to avoid having to read the data from the cache into the cluster node just to perform a flush. However, this may be very difficult to achieve because of the large page size and the time it takes to fill a page. Usually the cluster node has buffers in memory only for the recent host I/O requests rather that having pages of recent I/O requests.

Cache pages are flushed according to a selectable schedule except for the write through cache pages which are flushed immediately. These flush policies are configurable at the volume level. They include the following.

- Capacity-based flushing: writes to online storage occur once a certain amount of new data is stored in the local cache
- Time-based flushing: writes to online storage occur after a specified time period has elapsed
- Capacity/time-based flushing: writes to online storage occur either after a certain amount of new data is stored locally or a specified time-period has elapsed
- Bandwidth based flushing: write to the online storage occur when there is available capacity to the storage
- Manual flush: in addition to (and only in addition to) other flushing policies, an option to initiate a flush manually must be presented Irrespective of the flush schedule selected, pages are usually flushed when there is bandwidth available. The cache module can guess at the available bandwidth based on the current I/O activity.

File Format

A design concern that was mentioned above is cloud performance and file size. Accessing large files to modify only a small portion of the file is very inefficient. However, it is also not desirable to have files smaller than needed so that frequent reading of many files is needed in order to satisfy a single request. The appropriate file size is a balancing point that is likely to change over time and the CAS design accommodate this change.

Structured files are used. If a 1 MB cache page only has one valid sector of data in it the cache page written to the cloud will contain only that 1 sector of data and the necessary metadata to identify the location of that sector in the page. However, if a cache page is nearly fully populated then empty spaces will be filled with an uninitialized data pattern and the data in the page will be represented as a single contiguous file. A cache page file in the cloud may look like this:
Volume_ID//which volume is this page in
Region_ID//which region in the volume is this
Page_ID//Which page in the volume is this
flush_time//logical time of the flush
extents//variable length extent table
LBA offset in page//last extent in table has invalid value such as −1
extent length in LBAs
offset in cache page of data start
page_data//variable length extents placed contiguously in file.
EOF The Volume_id, Region_ID, and Page_ID are not necessary parts of the page but certainly help in debugging and runtime sanity checks.

The Region of index holds pointers to pages. A region logically has a fixed number of pages. Only pages which are in the cloud have entries in the cloud index file.
Volume_ID//which volume is the region in
Region_ID//Which region is this
pages_per_region//max pages in this region
valid_pages//number of valid pages in this region
page_size//size of page in sectors
pages//variable length page table
page_index//0 through pages_per_region−1
  flush_time//logical time page was flushed
page_file//file name of the page
  //these two fields repeat for each version of the page.
  page_index . . . .
  EOF
Ordered Events Pages are flushed to the cloud storage such that when data written to the cache at time Tn are committed to the cloud, all data written to the cache for a consistency group prior to time Tn must also be written to the cloud. To perform the flush the set of pages which will be flushed is decided. This is not a trivial problem. Assume node A receives a write 1 at time T1 and initiates a flush. Node A then receives a write 2 at time T2. This write 2 is written to a cow cache page and is not included in the flush set. Node B receives a write 3 at time T3 and processes the write 3. Node B receives the notification that a flush is in needed and establishes the flush set which includes the write 3 from time T3. The write 2 at time T2 is excluded and we have lost the ordering.

The cluster software 800 already provides strict ordering of cluster events. The cache code leverages this ordering by requesting a timestamp from the cluster code for each write operation. This allows the cache code to determine the exact ordering of write requests relative to cluster messages and write requests relative to each other.

| Time | Node A | Node B |
|------|--------|--------|
| T1 | write 1 received | |
| T2 | | write 2 received |
| T3 | Flush set established on node A | |
| T4 | write 3 received | |
| T5 | | write 4 received |
| T6 | write 5 received | |
| T7 | Flush message sent to node B | |
| T8 | | write 6 received |
| T9 | | Flush message received |
| T10 | | write 7 received |
| T11 | | flush set established on node B |
| T12 | | write 8 received |

Once the flush set is established those pages can not be modified until the flush completes. However, host I/O which would map to those pages are allowed to continue. To accomplish this the cache module takes an instant snapshot of those pages. Any host request which needs to modify a cache page in the flush set uses copy-on-write to generate a new page outside of the flush set for new I/Os. Any additional modification requests uses the existing writable copy of the page. When the flush completes the original version of any copied pages is freed.

To maintain crash consistency not only must the pages be flushed in Tn order, but all pages in the flush set must be flushed atomically. To get true atomicity at the time the pages are flushed is expensive in terms of coordination among nodes accessing the cloud. Based on the assumption that a flushing node has exclusive authorization the region being flushed an inexpensive flushing model is implemented at the cost of added overhead when recovering from a crash.

All host I/O for a given cache region are processed by the node that has authorization for that region. Only the node with the authorization can perform the flush. This means that during a flush no node will be accessing the cloud to read or write the pages being flushed. Additionally, the region index can only be accessed by the flushing node. This allows the flushing node to write the new/modified pages to the cloud then modify (overwrite) the index of pages for that region. Pages can not be read in the incorrect temporal order because none of the pages being flushed are read from the cloud.

Overwriting files in the cloud is preferable to writing a modified copy of a file then updating a pointer to the file. The overwrite requires a single I/O to the cloud and is guaranteed atomic by the cloud vendors. Writing a copy then updating pointers requires modification (copy and pointer update) each file all the may to the root node.

Figure 11:
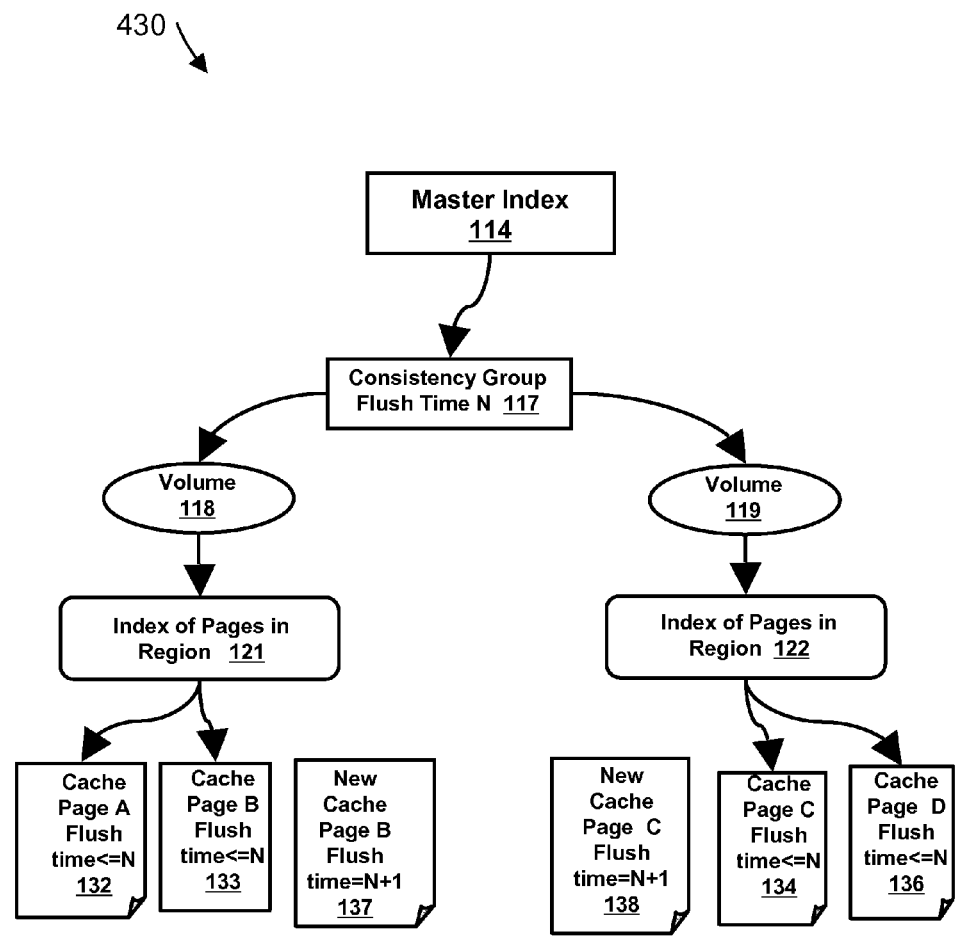
FIG. 11 is a schematic diagram of the process of writing new cache pages to the cloud.
Figure 12:
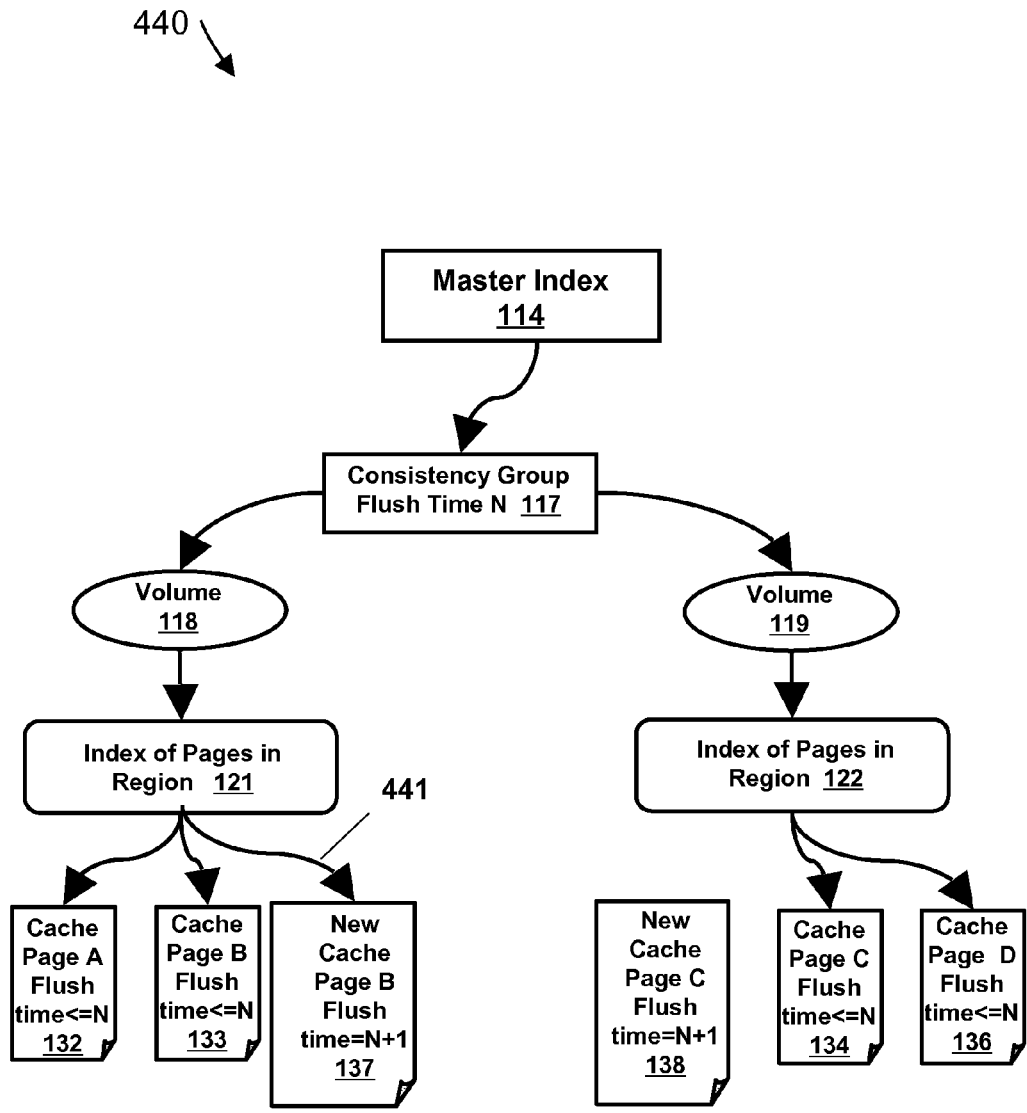
FIG. 12 is a schematic diagram of an index pointing to the new cache page of FIG. 11.
Figure 13:
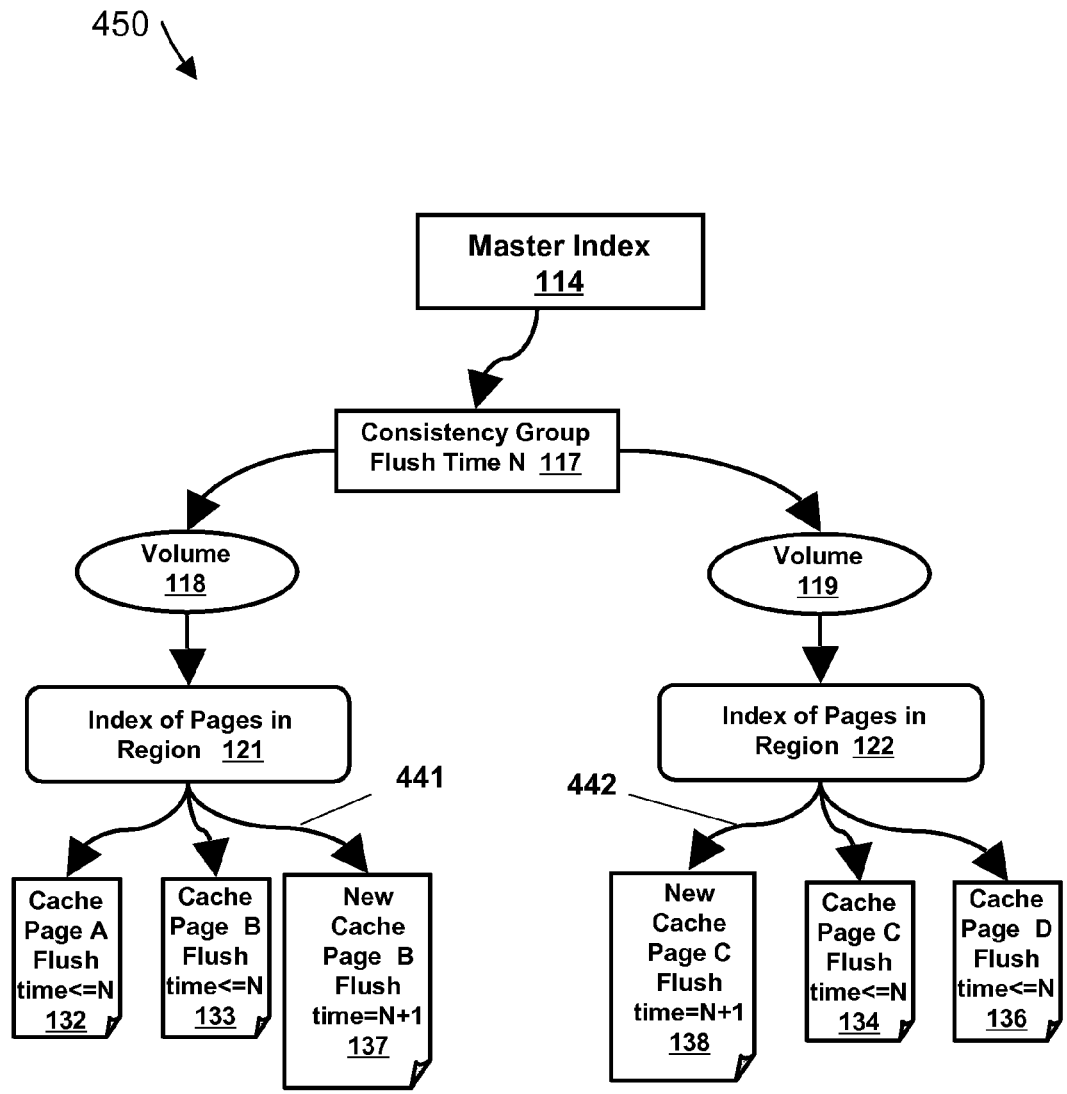
FIG. 13 is a schematic diagram of two indices pointing to both the new and old cache pages in FIG. 12.
Figure 14:
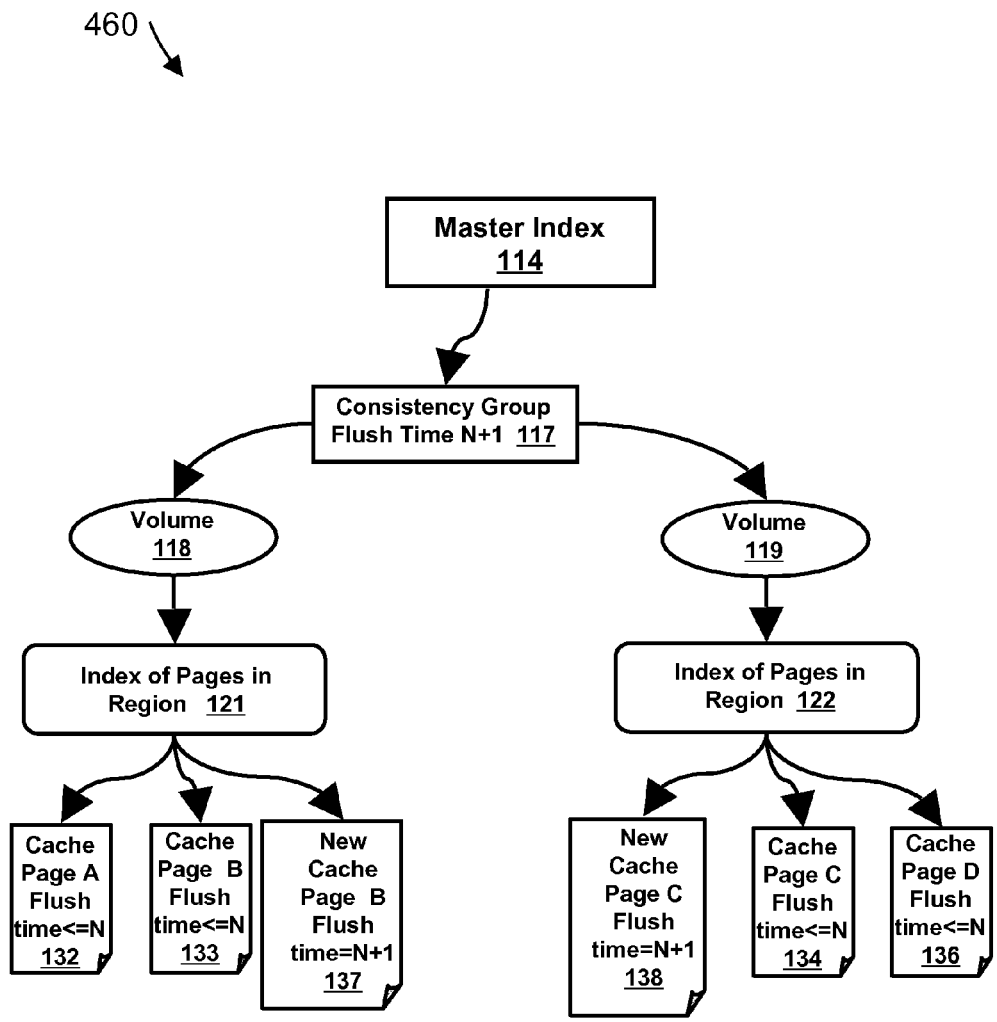
FIG. 14 is a schematic diagram depicting replacing the old cache pages with the new cache pages and deleting the old cache pages.

Referring to FIG. 9, the master cache index 614 includes consistency group I 617 and consistency group II 615. CG I 617 includes volume 618 and volume 619 and CG II 615 includes volume 620. Volume 618 includes the indices of cache pages in region A 621 and volume 620 includes the indices of cache pages in region B 622 and the indices of pages in region C 623. The cache pages in region A are pages 624, 625, 626. The cache pages in region B are pages 627, 628 and the cache pages in region C are pages 629, 631. The diagrams in FIG. 10 to FIG. 14 show the modifications to the cloud step by step and describe how consistency is assured at each step. Referring of FIG. 10, initially the cloud contains volumes 118 and 119 within CG 117 at a time before the flush time N. Volume 118 includes the indices of cache pages in region 121 including cache pages 132 and 133 contained before the flush time N. Volume 119 includes the indices of pages in region 122 including cache pages 134 and 136 contained before the flush time N. Next, two new cache pages B 137 and C 137 are written at time N+1, as shown in FIG. 11. New cache page 137 is in region 121 of volume 118 and new cache page 136 is in region 122 of volume 119. There is no reference to the new pages so there is no chance for a loss of consistency. Next, an index points to both the new cache page B and to page B which is about to be replaced, as shown in FIG. 12. The current flush time N is prior to the beginning of the new flush time N+1. The pointer 441 to the new page B has the flush timestamp N+1 of the active flush in its index metadata. This timestamp is greater than the current flush time thereby making the new page B inaccessible. Next, the pointer 442 to the second updated page C is updated with the same process as for page B, as shown in FIG. 13. Each region index is updated independent of the other region indices. Finally, the flush time in the CG file is updated to N+1 and the old cache pages are replaced by the new cache pages, as shown in FIG. 14. This is the atomic action that allows any access to the pages to use the newer pages B, C rather than the older pages B, C.

The entire flush operation includes one write to each of Region Index file, a write of each new page, and a write to the CG file. Access to the index and pages is done by relying on the cluster authorization 810 provided by the cluster module 800 and the atomic overwrite of existing files is provided by the cloud vendors. The CG file modification may need a cluster lock or perhaps the flush token includes the lock of the CG file. The Master Index 114 and Volume files 118, 119 are not modified to perform the flush.

Internode Flushing Coordination

Until now a critical detail of the flush has been mentioned only in passing. The flush set must include all pages in the consistency group up to time Tn. That is all pages in the cluster. The flush must be coordinated across nodes.

The process for flushing in a cluster using local caches (shown in FIG. 7A) is:

A node decides a flush for a CG is needed.

It gets the flush token to the CG.

Then the process described above begins. Each node works independently through the steps shown in FIG. 11, then informs that node with the flush token that they are completed.

Once all nodes have completed the node holding the flush token can update the CG file to complete the flush.

When all nodes have completed the flush token is released.

When a shared cache (shown in FIG. 7B) is in use then:

A node decides a flush for a CG is needed.

It gets the flush token to the CG. If all nodes are in an initial state, the flush token is held in the shared state. When one node get exclusive access to the flush token the other nodes take this as a signal that a flush is beginning and they can be ready to make a copy-on-write snapshot of any page being modified during the flush. Some mechanism (such as release of the flush token) causes the nodes to cease the copy-on-write activity and free any flushed pages which were the source of the copies.

Each node creates a list of pages being flushed and gives this list to the flushing node.

The node with the flush token flushes all pages in the flush set to the cloud.

The flushing node completes the flush process for all regions in the CG, even those regions held by other nodes. This is safe. Holding the flush token prevents even the nodes with region authorization from accessing the cloud for the region. Regions in the CG which are not cached at the time the flush begins can still be accessed in the cloud for read. If each node is allowed to flush their own pages then there will be multiple points of failure and a more complicated recovery procedure.

Garbage Collection

As a normal process of flushing, old pages will remain in the cloud pointed to by valid, but old, entries in a region index. If such an entry is encountered during a flush, the old page will be deleted and the region index pointer deleted. The system does not rely on flush processing to cleanup all the old pages. A special garbage collection process scans the cloud and deletes old pages. In some embodiments, the cleanup process is part of acquiring region ownership.

Cache Recovery

Shared Cache Recovery

Single Node Failure

Figure 15:
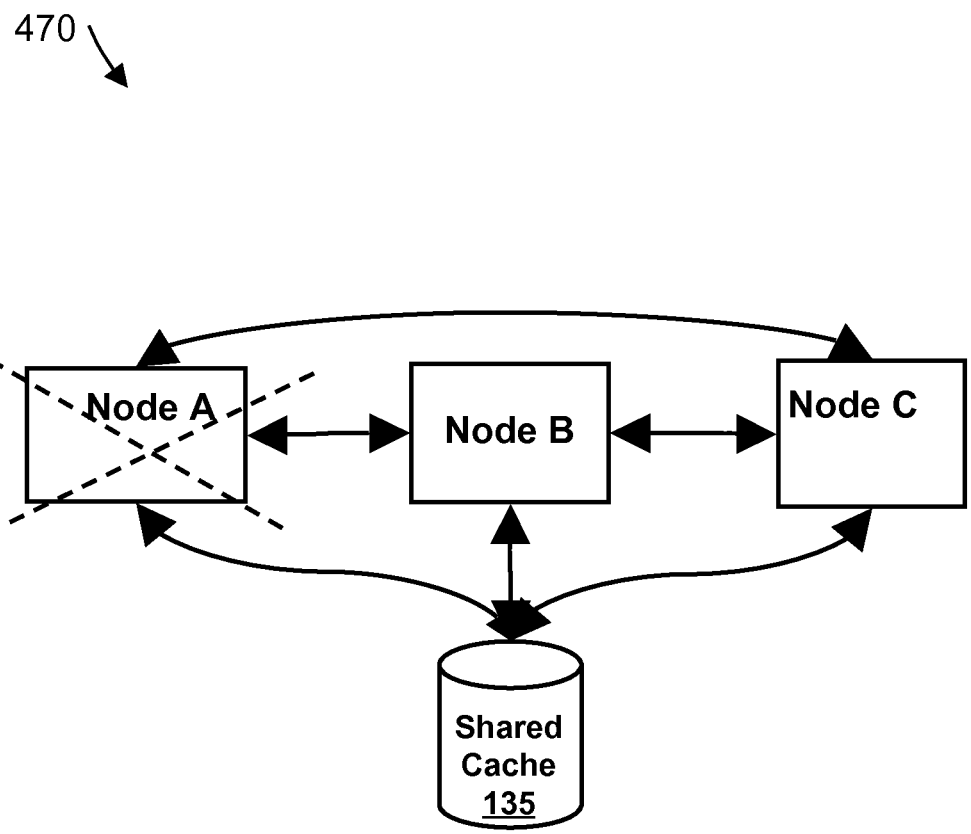
FIG. 15 is a schematic diagram depicting a single node failure in a shared cache multi-node system.

As was mentioned above, the cache space for a volume is split into regions and before a node can perform an operation on a region it must get authorization from the cluster software 800. Referring to FIG. 15, a three node cluster includes nodes A, B and C having access to shared cache 135. Node A has exclusive authorization for a region of the shared cache. Node A crashes. The cluster software 800 on nodes B and C detects this crash and revokes authorization from node A so that other nodes may process I/O requests. When authorization is granted on the surviving nodes B and C it is done with a specific status indicating that the state of the previous owner has changed. Nodes B and C have direct access to the shared cache 135 and therefore they can simply start reading what was written by node A once they have authorization to do so.

Cluster Failure

In cases where the entire cluster fails simultaneously (i.e., all nodes A, B, C crash at the same time due to software or hardware errors, or due to a power failure) the cache will survive because all the cache data are safely stored in the disk array providing the cache storage. At some point as the nodes A, B, C reboot and the cluster is reestablished, nodes A, B, C, receive authorization, find the metadata and begin accessing the cache data. Writes that were in progress at the time of the crash are addressed by the crash consistency feature, as was described above.

Mirrored Write Cache Recovery

When a node fails or becomes degraded the system relies on the clustering module 800 to inform the cache module 300 of the state change. The surviving nodes stop mirroring any new data to that failed node and initiate a high priority flush of the cache pages which were mirrored on the failed/degraded node. In other embodiments, a new mirror relationship is established with a surviving node but that requires flushing cache pages which are already mirrored to free space in the cache for the degraded pages. It is most efficient to just flush the unmirrored data unless there are plenty of free pages available somewhere.

Single Node

Figure 16:
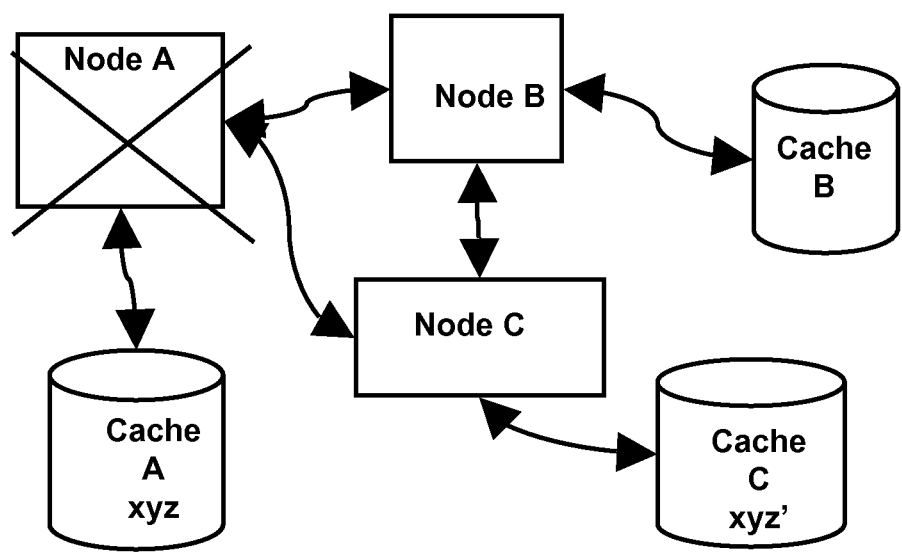
FIG. 16 is a schematic diagram depicting a single node failure in a mirror cache multi-node system.

In a mirrored write-back cache architecture nodes can not access the caches of other nodes as they do in the shared cache architectures. Data cached on a remote node can only be accessed through message passing between the nodes. Referring to FIG. 16, in a three node cluster including nodes A, B, and C accessing cache A, cache B and cache C, respectively, node A fails while processing writes to a cache region of cache A. Since node A is processing writes, it must have authorization from the cluster for this region. Node A is also mirroring this region to Node C. Writes x, and y have been mirrored in node C. Write z is in node A's cache but not in node C's at the time of the failure. Because the mirror write to node C must complete prior to node A acknowledging the write to the host we are assured that the host has not been acknowledged. We don't know and don't care if writes x and y were acknowledged. Node B receives a write request to the region which node A was authorized to write to. Node B requests authorization from the cluster and is granted with a special status indicating that the authorization was taken from node A. The cluster can only do this after performing all necessary checks to confirm that all other nodes see node A as dead and that the cluster is not in a split brain situation. Now node B has authorization to access a potentially dirty cache page but it has no idea where the data is cached. Node B searches all other cluster nodes looking for the cached data. This is done by broadcasting a message in the cluster asking for the data. Once Node B determines that Node C has the cached data it can issue a request to node C to either:

take ownership of the region from node C which would cause node C to flush it's data to the cloud or, Node C can make Node B the new mirror of the data.

Two Node Failure and Cluster Node Failure

If both nodes A and C fail in the above mentioned situation before the data can be flushed are mirrored to another node then this is a double failure. The data is unavailable until either of node A or C is back online. Until that time all I/O requests to node B for the affected regions will return a BUSY status to the host. If the administrator determines that nodes A and B will not be available again (permanent hardware failure or site was destroyed) then the cached data is lost forever. The only way to recover from this is for the administrator to restore them from the backup. There is also an option in the user interface that allows all regions of the volume to be made (unauthorized) so that the writes from backup may occur. The user will be required to destroy the volume, which will release the authorization for all regions and cleanup the cache automatically. The user must create a new volume and put the backup there.

Cache Storage Failure in a Mirrored Cache

In each of the above examples a node failure is discussed. If the cache storage were to fail rather than the node itself the algorithms are the same. The only difference is that Node A will still be alive and able to respond to messages. Node A can not take the time to determine if its inability to read from the cache is due to a persistent or transient failure. In either case Node A will release it's ownership of the region with a special status that informs the node mirroring the data that the mirror state is degraded and must be reestablished. Depending on the type of failure this recovery may affect one region, some, or all that were cached.

Split Brain Failure

The Cluster module 800 is responsible for detecting and handling split brain situations. Such situations are transparent to the other modules in the cluster node.

Flush Recovery

If a node fails during a flush, recovery is needed. Assuming that a flush is in progress and a region index has been updated to point to a page at flush time N+1. The node fails before updating the flush time in the CG file so that page is inaccessible. However, the system continues running and other flushes occur to the pages in that CG. Once the CG's flush time reaches N+1 then a read may access the page written during the failed flush. This would violate the Crash Consistency guarantee. To prevent this crash consistency violation, the flushing node writes a flush table to the cloud which lists the volumes and regions being modified as well as the flush time of the new pages. When a crash occurs the recovering node looks for a flush table written by the failed node and deletes all files and region index references to the pages with the flush time being used by the failed flush. The region list in the flush table restricts the set of regions that must be checked to speed the recovery process.

Cache Checkpoint

A checkpoint command is available to volumes and consistency groups. When this command is issued, all write requests issued prior to the start of the checkpoint will be synchronized with the cloud storage before the checkpoint command completes. This is implemented by taking advantage of flushing code which guarantees that all data is flushed up to time Tn. In this case Tn will be the time the checkpoint command is received.

Page Replacement Algorithms

This is the heart of the caching module 300. Page replacement algorithms determine which pages should be purged from the cache to make room for new pages. Correctly selecting the pages to be purged has a tremendous effect on cache performance which is generally measured by hit ratio and latency.

The cluster cache is not a CPU cache and is not a file system cache. It is a distributed array cache and has some critical differences. The primary difference is that the cluster cache sits behind both the CPU data and host file system caches (when the host is not using raw devices to access the cluster) in the hosts. Effective caching at the host level should reduce repeated reads to the same block because the host will have the block in its cache. The same is true for read ahead when sequential read are occurring.

Actually, the host read cache may actually make the cluster read cache ineffective. Assuming a series of pages (100-120) is read by a host and both the node and the host put these pages into their cache. For a period of time the host processes these pages incurring repeated cache hits in the host cache. The cluster node only sees the initial reads and after some time will purge these pages because it appears that the host does not need them.

The cluster write cache has different issues. All write caches provide two benefits. The first is maintain a copy of the data to quickly service a read request. The second is avoiding the backfill of the cache page when flushing a partially filled page. As with the read cache example above, the host is likely to service read requests from it's own write cache rather than the array cache. However, due to the high cost of accessing the cloud, caching a page from a previous read or a write to avoid a backfill for a flush may have significant benefits. Consider a typical write operation where data is read from disk, modified then written back to disk. If the write does not fill the entire cache page then a backfill is required. Without caching this is three disk operations: primary read, backfill read, write. Te CAS software eliminates the backfill read. The cache should also reduce the number of "primary reads". Using write-back caching allows the cluster Cache to defer the write later, perhaps coalescing multiple host writes into a single cloud access.

The host file system cache may not be in use due to the host accessing the cluster array through raw devices. Generally raw devices are used by highly intelligent applications such as Oracle which have their own caches. The specialized caching algorithms of these applications are frequently more efficient than the general purpose file system caches.

Therefore, the cluster cache does not implement a read ahead cache algorithm. It does not include temporal or spatial locality of host reads in an attempt to improve cache hits for host reads. The key to efficient operation of the cluster cache is minimizing backfilling cache pages for a flush. We make the assumption that a page which is written once is likely to be written again in the near future. This is based on the spatial locality inherent in the cache page and the likelihood that only a small portion of that data is read by host will be modified and written back. Therefore, a least recently used (LRU) algorithm is used to select write cache pages for replacement. This is a simple LRU where a write operation puts a page at the head of the list and purged pages are taken from the tail of the list. We also want to capture the possibility that a host is reading a page so that it can be modified. There is a separate LRU to track the age of pages which have been read. It would be nice if we knew which reads were part of a read/modify/write so that CAS could cache only those reads, but we don't. Subsequently all reads are cached with the hope that a backfill will be avoided for a later write.

A page can be in the read and write LRU simultaneously. In an attempt to track the host usage of the page, it will be placed in the appropriate LRU and will be updated based on host read and write activity. When a purge is needed from the read LRU and the page at the tail of the read LRU is also on the write LRU then that page will be removed from the read LRU, will remain on the write LRU, will not be purged. The purge code will then attempt to purge that new tail of the read LRU. The same is true for write LRU purging.

Secure Page Freeing

The user may specify on a per volume basis that as cache pages are freed in the cloud and in the cache array that the freed disk space is overwritten. The user may select cloud only, cache array only, or both. This will be a significant increase in array/cloud traffic but is available to the user if needed. The actual overwrite responsibility lies with the SI 240. The cache module 300 specifies a file/region and specifies that it be overwritten. This allows the SI 240 to take advantage of optimizations such as the SCSI Write Same command to reduce bandwidth to the array.

Cache Metadata

The cache module 300 maintains persistent data structures which are stored within the cache and not in the cloud. The metadata are stored persistently so that in the event of a node crash the data can be recovered either when the node reboots or by another node that is still running and has access to this cache. Also, because the CAS supports an unlimited cache size, there is no amount of RAM that guarantees that all metadata can fit in memory. The cache metadata includes:

Volume ID
location in the volume
page size
valid data map
dirty bits

These metadata are used for finding the cache pages. A multi-processing module (MPM) is used in order to find where the metadata are. All the cache needs to do is specify a guid/luid/index identifying the needed metadata and the MPM will get it from disk.

Cache Objects

| Table 1 lists the cache objects and their responsibilities. | |
| --- | --- |
| Object | Responsibilities |
| Region | Handles ownership of a set of pages, including forwarding requests |
| Page | Tracks the state of the page: dirty, valid, etc |
| Consistency Group | Volumes in CG share crash consistency operations |

Data Compression

The CAS software 200 provides for data compression via compression module 700. This means that identical blocks of data are written to storage only once and later writes of the same data to a different location only require a metadata update which indicates a reference to the data. Duplicate blocks are detected by generating Message-Digest algorithm 5 (MD5) checksums on the data and comparing the generated value with generated values of all previously written data.

Encryption

The CAS software 200 uses cloud storage which is not only outside of the data center housing the servers, but the cloud storage is neither owned or controlled by the companies using the Virtual Array. Furthermore, this path to the cloud storage is over the Internet. Few users will allow their proprietary company information to be sent over the Internet and stored at a site which they do not control even if the Internet connection is secured and the cloud data center is protected.

The CAS software provides encryption of user data as well as the associated metadata with the encryption module 400. The data is encrypted before leaving the safety of the users data center.

Mirroring

The Mirroring Module 600 replicates data across cloud locations. This is the equivalent of N-way raid-1 mirroring for higher availability in the event of problems at one or more cloud vendor. A cloud location is a segment of a cloud vendor account. Typically, each cloud account has a single segment and the mirroring is done across different accounts with different vendors. However, the software can also accommodate mirroring within a single account at a single vendor.

Mirroring is enabled or disabled at the volume level. Configuration metadata include a volume ID and a set of cloud locations. Part of the MDC interface allows a cloud location to be specified. When the mirroring module 600 is given a write request it will generate a new request to the MDC for each cloud location in the mirror set. All of the write requests must complete before the mirroring module will complete the processing of the original write request from the MDC.

Read requests result in a read to one of the cloud locations. This read is issued through the MDC. If the status (which also passes through the MDC) indicates an error, the mirroring module 600 will retry the read to another cloud location in the mirror set. Only if all cloud locations in the mirror set return an error will the mirroring module fail the read request back to the MDC.

Only the mirroring module knows which cloud segment(s) is being used by a volume. Even if a volume is not mirrored the I/O must still pass through the mirroring module so that the request can be forwarded to the appropriate segment.

Error Handing

The mirroring module 600 issues reads and writes to the configured clouds regardless of past error received during read or write operations. It is the responsibility of the CSI 242 to determine if a cloud is offline. If this occurs then the CSI 242 will notify the mirroring module 600 via a callback which was registered earlier. While the affected cloud(s) are offline the mirroring module will operate in degraded mode and not attempt to access the failed cloud. When the cloud is back on line, the CSI 242 will detect this and notify the mirroring module 600.

When an offline cloud comes back online the mirroring module 600 must resynchronize the newly recovered mirrored side with the online mirror sides(s). This may be accomplished by reading all data from one of the online sides and writing it to the recovering side. This is very inefficient if only a small percentage of the volume has changed while the side was offline. Another approach is to track each write that occurs while the side is offline and to copy only the modified data to the recovering side. While the side is recovering it will not be read to satisfy host requests. Host writes to the portion of the recovering side which has been recovered are allowed (actually required). Host writes are not allowed to the portion of the side which is not yet recovered.

Upon being notified of a cloud failure, the mirroring module 600 initiates a health check of the mirror set. While the health check is in progress no write operation in progress is allowed to proceed. The health check entails issuing a read to all online members of the mirror. If all cloud members are offline then the mirroring module 600 initiates the shutdown of the affected volumes. All in progress write operations in the mirror module will fail. If any of the cloud members are still online then the volume remains online and the write operations are completed successfully.

Figure 18:
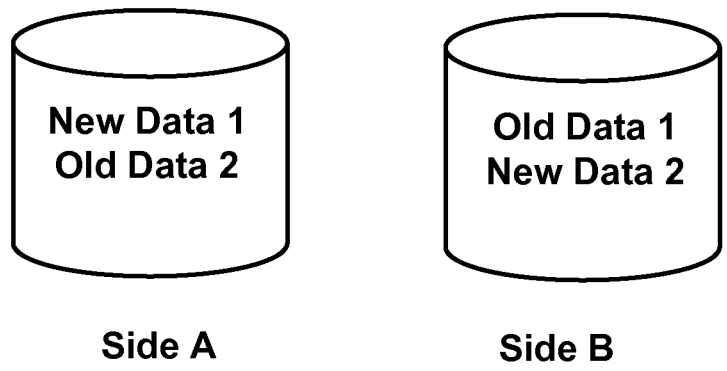
FIG. 18 is a schematic diagram of a volume with two mirrored sides A, B after two concurrent host writes where write 1 succeeds in side A and write 2 succeeds in side B.

The purpose of the health check is to prevent a situation from which the cluster can not recover. Referring to FIG. 18, two concurrent host writes are performed to a volume with two mirrored sides, side A and side B. Write 1 is issued to both sides but only gets to side A when side B is found to be offline. The write succeeds and the host is acknowledged. At the same time write 2 is issued to both sides. This write succeeds to side B only and side A is declared offline. The write succeeds and the host is acknowledged. With both sides offline the volume is declared offline and is shutdown. Later cloud access is restored and mirror recovery begins. Side A has old data 2 for write 2 and new data 1 for write 1. Side B has the opposite. We have to pick one side to read from and then restore the other side. However, neither side can be chosen. This is an unrecoverable situation and this is why the health check is used to prevent the host from being acknowledged by shutting down the volume.

Storage Interface

At the lowest level of the CAS 200 the I/O architecture is the Storage Interface 240. The Storage Interface (SI) provides a set of protocols to read and write and manage the underlying storage. The storage may be in the cloud, a file system, or a block device. The SI will expose only what is necessary for the higher level CAS modules to access the storage. The SI 240 includes a local interface (LSI) and a cloud storage interface 242.

Cloud Storage Interface

The Cloud Storage Interface (CSI) 242 provides a set of routines that are used to manage and access the data stored in the cloud regardless of the cloud vendor providing the storage. Examples of such cloud vendors include Amazon S3 and Nirvanix. The CSI provides a wrapper around the interfaces provided by these cloud vendors. Support for each cloud vendor is maintained in the CAS software as a dynamically linked library. This allows support for new cloud providers to be added to a cluster node without having to restart that node. The interfaces to cloud storage can be broken into several categories. Each is described here in general terms, vendor specific issues and a likely common interface that CSI could provide. The entire Amazon interface consists of about sixteen functions. Nirvanix has about six name spaces each with dozens of functional interfaces. gSOAP is used to develop the C++ API that CAS uses to access the cloud.

Authorization and Authentication

Authorization is the means by which the cloud vendor verifies and restricts access to the stored data only to users with proper authority. Authentication is how the cloud vendor determines that the user is really who they claim to be.

Nirvanix provides an initial login call which generates a session key. The login takes as input the application ID, username and password. The session key must be provided with each command which accesses the data in the Nirvanix cloud. All of this information as well as the login process occur privately within the SI. Amazon does not create a session. Rather it performs authentication and authorization on every data access request. For this to occur the request must provide an AccessKeyId, Timestamp, and a signature which is based on secret access key among other things. This also should not be exposed outside of the SI. The present system includes very different authentication methods each requiring very different types of information. As part of configuring the CAS to use a particular cloud account this information must be provided and saved in metadata. Then the SI well perform the authentication as necessary.

Error Handling

IO Operations

Amazon uses buckets and objects to describe the structure of their cloud file system. Nirvanix uses files and folders to describe theirs. They are basically the same thing. These file systems are not a block devices and are not the typical file system that users are used to. When accessing a file or object the entire file must be read or written except where Nirvanix allows writing to parts of a file (partial file update) and Amazon allows reading parts of a file (Chunked and Resumable Downloads). The present system design is not optimized based on vendor unique commands. Therefore all reads and writes can access the entire file. Each customer account with a cloud vendor is divided into one or more cloud locations. Each cloud location has a distinct addressable space presented to the CAS by the CSI. At the top level of each cloud account is a folder for each cloud location. There are limits on the number of folders (buckets) that can be created in an Amazon account and how those buckets can be named. There is a limit of 100 folders (buckets) per Amazon account. There is no limit on the number of files (objects) in Amazon.

The present system creates a small number of folders in each cloud location. In one example there are two folders: one for user data and the other for CAS metadata. A very large number of files is contained in each of these folders. The mapping from the generic CAS access handle to the specific cloud file occurs here. The CSI is presented with a cloud location and a guid/luid/index in that location. The CSI hashes the guid/luid/index to a metadata file. That metadata file holds the information which maps the guid/luid/index to a particular file in the cloud location. The cloud read and write interfaces 242 require a MD5 checksum to so that the cloud site can verify that the data were not corrupted during the transfer from the cluster node to the cloud or while in the cloud. The CSI 242 uses this same MD5 checksum to verify correctness of the data after it has been read from the cloud. This only provides data protection during the transfer to/from the cloud. It is desirable to have this type of protection as close to the host as we can get it.

Cloud Health

The CSI 242 has the responsibility of detecting when clouds fail and go offline and when service is restored. This is done by monitoring the status of I/O requests sent to the cloud from the cluster node or with an explicit request to the cloud if the cluster node activity is not frequent enough. When a cloud transitions from online to/from offline all registered modules are notified. All CAS software modules may register with the CSI for this service.

Local Storage Interface (LSI)

Local storage behind the LSI is either a block device 244 or a file system 246. Modules using the Local Storage Interface (LSI) are not required to know the nature of the underlying device(s) which provide the local storage. The interface provided by LSI may either look like a file system or a block device and internally provides a mapping to the other. Also, the LSI supports dynamically adding more local storage either by adding an additional array or more volumes in the same array. As the amount of storage exposed to LSI grows, the single address space which LSI exports also increase. This increase is completely transparent to the users of LSI. The cache module 300 is the primary user of the LSI. However, there are likely to be additional reasons to store data persistently in the local storage so the interface is not be cache specific.

The LSI provides a subset of the typical file system interface such as open, close, read and write. Open specifies a size of the region on disk that is needed as well as a guid/luid/index (GLI) which will uniquely identify the region of disk space allocated by LSI. The LSI returns a handle to the caller which is then used for calls to read, write and close this region. We call this opened region an LSI File. Calls to read and write the LSI File provide a buffer, the handle, offset into the region, and the size of the buffer. This allows the cache code to read or write selected portions of a cache page. A call to close takes only the handle returned by open. After the close call, the handle is no longer valid. In addition to close there is delete. Delete removes the mapping to the LSI file permanently. A close can be undone with an open.

LSI Mapping

Internally the LSI maps the guid/luid/index to a backing disk and offset or to a file in the backing file system. There may be many disks from many arrays providing the LSI backing Logical Unit Numbers (LUNs) with each LUN having a different size. Because the LUNs that make up the LSI may be added or taken away at any time the mapping structures which translate a GLI to a location in the local storage is saved in the disk/volume which is being mapped. The LSI has control over the entire contents of the backing device.

Cooked Backing Device

Managing logical volumes presented to the LSI is straightforward and similar to the management of cloud address space. The LSI creates files in the backing file system for the data written by the cluster node to LSI. The file name may be the guid/luid/index (or a unique value generate from them) which then allows the LSI to directly access the cache page without the indirection of a metadata access.

Raw Backing Device

In this instance there is not a file system behind the LSI. Therefore, the LSI needs it's own strategy for locating data on disk. Because the data written through LSI is not a fixed size, and can actually vary quite a bit, a rigid mapping scheme is not appropriate. In this case the following guidelines are used:
1. The device is divided into blocks of sizes 512 b, 4 kb, 128 kb, 1 MB, 4 MB and 8 MB. These are called size sets.
2. There is no fixed number of each block in each size set.
3. All blocks of in given size set is contiguous.
4. Each file written through the LSI will fit into a single block.

These guidelines allow the LSI to map a guid/luid/index to a single block. Furthermore, each block maps to only one guid/luid/index at a time. So the LSI either has one mapping for each block or the block is free.

The second guideline above suggests that the number of blocks in a size set may change. Actually the system allows the number of blocks to change dynamically. As a size set grows it must take blocks from adjacent size sets so that guideline 3 above is met. For the 512 b size set to grow it must take from the 4 kb size set. For 1 MB to grow it may take from 128 kb or 4 MB. As blocks are allocated from a given size set (4 kb for example) the blocks closest to the middle of the set are allocated first. This reduces the number of block that may need to be moved if the number of blocks in a size set is reduced.

Earlier in this section we described the mapping of a guid/luid/index to a block. Assume the LSI has access to a 100 GB raw device. If we divide that into size sets each with the same number of blocks then there are about 7800 blocks in each size set. If we divide the 100 GB proportionately among the size sets then there are about 2100 8 MB block and thirty five million 512b block. It is unlikely that there will be a need for that many small blocks but this 100 GB device is actually 2 TB and that there are 10 of them. That is 200 times more storage that the 100 GB device.

Performance

The LSI monitors the performance statistics of each backing LUN and may use this information to favor some LUNs over others.

Health Monitoring

The SI has the responsibility of detecting when storage (or the node's access to the storage) fails and when service is restored. This is done by monitoring the status of I/O requests sent to the cloud or local storage from the cluster node or with an explicit request to the storage if cluster node activity is not frequent enough. When a storage transitions from online to/from offline all registered modules are notified. CAS software modules may register with the SI to receive notifications for clouds, local storage or both.

I/O Interfaces

The system uses an off the shelf iSCSI front end.

Stack Support

Logging

Cluster nodes generate logging information which can be accessed by the user and field support as part of normal maintenance of the replication cluster. Logging is also used to monitor the system activity in detail. The logging provides information in a user readable format. This information include a severity level, the object and operation which encountered the event, timestamp, node ID, and other relevant information. The type, quantity and format of the information logged is likely to change over time and the logging mechanism must accommodate this.

Log Insertion

There is no global cluster log. Logging is a per-node activity. Each node maintains the log in memory, likely in a ring buffer. The log may be saved to disk so that the total log size can exceed the ring buffer size. Log events may be generated by any CAS software component above the OS layer. When generating a log event the caller must specify which software component is generating the log,
a log id which is defined by the software component that generated the event, severity (debug, info, attention, warning, error, critical),
information unique to the specific log event such as error codes, LUN numbers, text, etc.

The logging software automatically collects the file name, line number, time/date, sequence number, and node id. All of this information is saved in a record in the logging buffer. The log buffer can not be allowed to grow unbounded therefore as new events are generated older ones are freed or overwritten as the buffer fills. The oldest events are freed first.

If the same log message is being generated repeatedly with the exception of timestamps then the logging software detects this and insert a log event such as "last event repeated N times". The event with the earliest timestamp is shown. The timestamp of the "last event . . . " message along with the timestamp of the earliest event shows the span over which the events were generated.

UI Access

The log 203 can be accessed from the User Interface (UI) 202. Log events are only sent to the UI when requested by the UI. Once the UI has acknowledged receiving a set of log records, those records may be freed from the memory of the cluster node. Log events are given to the UI as a structure which specifies each element of the event separately so that the logging software can filter or sort as needed. The unique information in the event is treated as a single member of the structure and can not be divided by the UI or the logging software. Older log events are transferred before newer events.

When sending log events to the UI the logging code pins a set of events in memory and provide the UI access to those events for transfer to the remote UI. While pinned those events can not be overwritten by new log event or freed. Pinning allows the logging software to avoid copying the log data for use by the UI. The number of log events transferred in a single operation is determined by the UI. In addition to transferring log events the logging software also reports the number of unread log events and the oldest log event. The UI may clear the log of all events without reading them.

Alerting

An alert is similar to a log event in that it describes a system event. The primary difference between Logging and Alerting is that alerts are sent to the UI preemptively. Alerts are used when a serious condition has occurred that requires immediate action such as a node failure, back end storage failure, host logical volume being taken offline unexpectedly, etc. The alert provides as much information as is appropriate to identify the nature of the situation and which components are involved. The alert does not suggest a course of corrective action. The corrective action must be determined by the administrator or technical support. As alerts are generated they are sent to the UI for processing. Once the UI has the alert it can be deleted from the node's memory.

Alerts are generated much less frequently than log events. However, a situation may develop where many alerts can be generated in a short time span. This likely indicates a serious problem with the node. In order to make available memory for error processing, there is a maximum on the number of alert structures that can be held in the node's memory. This is on the order of hundreds. If there is no space available for new alert structures then new alerts are dropped, preserving the older alerts. For each alert generated a log event is also generated. If an alert is dropped then an additional log event is generated indicating this.

Statistics

Statistics are gathered for the inner working of the cluster nodes. This service is available to the software in the cluster just as tracing and logging are. Some statistics are displayed through the User Interface. Other statistics are gathered for debugging purposes only.

The statistical gathering services that are provided include counter, high/low average, histogram, and statistical creation. Optionally, each of these statistical services may be saved persistently in the LSI.

Counter

This is a simple counter which can be incremented and decremented. It can either allow the value to become negative or can generate and exception if an attempt is made to decrement zero.

High Low Average

This statistical service accepts a single numeric value which may be recorded as the highest in the set or lowest in the set. Regardless of it being the highest or lowest it is still added to the average value for all numbers in the set.

Histogram

A histogram creates a user defined number of buckets each with a minimum and maximum value. The value range of the buckets do not overlap. An attempt to save a value which does not fit into any bucket results in an error. Each bucket can act as a counter or a high-low-average.

Statistical Creation

Before statistical services can be gathered a statistical object must be created. The creation specifies the type of statistical property to be gathered and specifies a human readable name that is used for UI display or examination from a debugger. A handle is returned from stat creation which is used in calls to generate statistics. Application CAS 200 is designed to run on a server in any number of operating systems including Linux, among others, and where the OS system includes a multi-threaded preemptive kernel, i.e., two or more concurrently running tasks.

Several embodiments of the present invention have been described. Nevertheless, it will be understood that various modifications may be made without departing from the spirit and scope of the invention. Accordingly, other embodiments are within the scope of the following claims.

What is claimed is:

1. A method for replicating data to one or more online storage clouds comprising:
   providing a data replication cluster comprising at least a first host node and at least a first online storage cloud, wherein said first host node is connected to said first online storage cloud via a network and comprises a server, a cloud array application and a local cache and wherein said local cache comprises a buffer and a first storage volume and wherein said first storage volume comprises data cached in one or more buffer blocks of said local cache's buffer;
   entering a first request by a user to "write" data in said first storage volume;
   receiving said first request by said server;
   identifying said first storage volume's internal structure and initiating processing of said first request;

verifying first authorization of user to "write" data in said first storage volume, and upon approval said first authorization, passing said first request to said local cache;

verifying second authorization of said user to "write" data in a specific region of said first storage volume by said local cache;

upon approval of said second authorization, determining if a specific extent exists in said local cache's buffer for receiving said "write" data;

upon confirmation that said specific extent exists in said local cache's buffer, storing said "write" data in said extent, wherein said extent comprises said one or more buffer blocks of said local cache's buffer;

requesting authorization to perform cache flush of the cached first storage volume data to said first online storage cloud, by said cloud array application;

upon receiving approval of said authorization, encrypting said cached first storage volume data in each of said one or more buffer blocks with a data private key, by said cloud array application;

assigning metadata comprising at least a unique identifier to each of said one or more buffer blocks, by said cloud array application;

encrypting said metadata with a metadata private key, by said cloud array application;

transmitting said one or more buffer blocks with the encrypted first storage volume data to said first online cloud storage, by said cloud array application;

creating a sequence of updates of said metadata, encrypting said sequence with said metadata private key, by said cloud array application; and transmitting said sequence of metadata updates to said first online storage cloud, by said cloud array application.

2. The method of claim 1 further comprising compressing said cached first storage volume data in each of said one or more buffer blocks.

3. The method of claim 1 wherein said metadata further comprise one of a volume index, a region index, page index, maximum number of pages in a region, number of valid pages in a region, size of a page, file name of a page or a logical time stamp.

4. The method of claim 1 further comprising upon receiving approval of said authorization creating a copy of each of said one or more buffer blocks comprising said cached first storage volume data.

5. The method of claim 1 wherein said one or more buffer blocks with the encrypted first storage volume data are transmitted to said first online cloud storage according to a RAID-1 replication algorithm.

6. The method of claim 1 wherein said sequence of metadata is transmitted to said first online cloud storage according to a RAID-1 replication algorithm.

7. The method of claim 1, further comprising analyzing said one or more buffer blocks to determine if data were previously written in said buffer blocks and upon determination that data were previously written in said buffer blocks, backfilling said previously written data by reading said previously written data from said online storage cloud.

8. The method of claim 1, further comprising upon confirmation that said specific extent does not exist in said local cache, allocating a new extent for receiving said "write" data.

9. The method of claim 1, further comprising upon confirmation that said specific extent does not exist in said local cache, freeing an existing extent for receiving said "write" data.

10. The method of claim 1, wherein said identifying and verifying are performed by said cloud array application.

11. The method of claim 1 wherein said first host node further comprises a local storage device and said method further comprises flushing said one or more buffer blocks with said cached first storage volume data to said local storage device.

12. The method of claim 1, further comprising acknowledging processing of said first request.

13. The method of claim 1 further comprising acknowledging completion of data replication to said first online storage cloud.

14. The method of claim 1 wherein said first online storage cloud comprises a cloud storage device and said method further comprises storing said first storage volume data in said cloud storage device.

15. The method of claim 1, wherein said first request is entered via a block based interface.

16. A method for replicating data to one or more online storage clouds comprising:

providing a data replication cluster comprising at least a first host node and at least a first online storage cloud, wherein said first host node is connected to said first online storage cloud via a network and comprises a server, a cloud array application and a local cache and wherein said local cache comprises a buffer and a first storage volume comprising data cached in one or more buffer blocks of said local cache's buffer;

entering a first request by a user to "write" data in said first storage volume;

receiving said first request by said server;

identifying said first storage volume's internal structure and initiating processing of said first request;

verifying first authorization of said user to "write" data in said first storage volume, and upon approval of said first authorization, passing said first request to said local cache;

verifying second authorization of said user to "write" data in a specific region of said first storage volume by said local cache;

upon approval of said second authorization, determining if a specific extent exists in said local cache's buffer for receiving said "write" data;

upon confirmation that said specific extent exists in said local cache's buffer, storing said "write" data in said extent, wherein said extent comprises one or more buffer blocks of said local cache's buffer;

requesting third authorization to perform cache flush of the cached first storage volume data to said first online storage cloud;

upon receiving said third authorization, creating a copy of each of said buffer blocks with said cached first storage volume data, compressing said cached first storage volume data in each of said buffer blocks and encrypting said cached first storage volume data in each of said buffer blocks with a data private key;

assigning metadata comprising at least a unique identifier and a logical time stamp to each of said buffer blocks;

encrypting said metadata with a metadata private key;

transmitting said encrypted buffer blocks to said first online cloud storage;

creating a sequence of updates of said metadata, encrypting said sequence with said metadata private key; and transmitting said sequence of metadata updates to said first online cloud storage.

17. A system for replicating data to one or more online storage clouds comprising:

a data replication cluster comprising at least a first host node and at least a first online storage cloud, wherein said first host node is connected to said first online storage cloud via a network and comprises a server, a cloud array application and a local cache and wherein said local cache comprises a buffer and a first storage volume comprising data cached in one or more buffer blocks of said local cache's buffer;

means for entering a first request by a user to "write" data in said first storage volume;

means for receiving said first request by said server;

means for identifying said first storage volume's internal structure;

means for initiating processing of said first request;

means for verifying first authorization of said user to "write" data in said first storage volume, and upon approval of said first authorization, passing said first request to said local cache;

means for verifying second authorization of said user to "write" data in a specific region of said first storage volume by said local cache;

means for determining if a specific extent exists in local cache's buffer for receiving said "write" data;

means for storing "write" in extent;

wherein said cloud array application is configure to request authorization to perform cache flush of the cached first storage volume data to said first online storage cloud;

wherein said cloud array application is configure to encrypt said cached first storage volume data in each of said one or more buffer blocks with a data private key;

wherein said cloud array application is configure to assign metadata comprising at least a unique identifier to each of said one or more buffer blocks;

wherein said cloud array application is configure to encrypt said metadata with a metadata private key;

wherein said cloud array application is configure to transmit said one or more buffer blocks with the encrypted first storage volume data to said first online cloud storage;

wherein said cloud array application is configure to create a sequence of updates of said metadata;

wherein said cloud array application is configure to encrypt said sequence with said metadata private key; and wherein said cloud array application is configure to transmit said sequence of metadata updates to said first online storage cloud.

18. The system of claim 17, wherein said means for entering a first request by a user to "write" data in said first storage volume comprise a block based interface.

19. The system of claim 17 further comprising means for analyzing said one or more buffer blocks to determine if data were previously written in said buffer blocks and means for backfilling said previously written data by reading said previously written data from said online storage cloud.

20. The system of claim 17 wherein said host node further comprises a local storage device and said system further comprises means for flushing said one or more buffer blocks with said cached first storage volume data to said local storage device.

* * * * *